United States Patent
Hoss et al.

(10) Patent No.: US 12,413,097 B2
(45) Date of Patent: Sep. 9, 2025

(54) SMALL FORM-FACTOR DEVICES WITH INTEGRATED AND MODULAR HARVESTING RECEIVERS, AND SHELVING-MOUNTED WIRELESS-POWER TRANSMITTERS FOR USE THEREWITH

(71) Applicant: Energous Corporation, San Jose, CA (US)

(72) Inventors: Alister Hoss, Phoenix, AZ (US); Cesar A. Johnston, Sunnyvale, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 18/408,470

(22) Filed: Jan. 9, 2024

(65) Prior Publication Data

US 2024/0223007 A1     Jul. 4, 2024

Related U.S. Application Data

(63) Continuation of application No. 18/146,314, filed on Dec. 23, 2022, now Pat. No. 11,916,398.
(Continued)

(51) Int. Cl.
*H02J 50/00* (2016.01)
*H01Q 9/04* (2006.01)
*H02J 50/27* (2016.01)

(52) U.S. Cl.
CPC ......... *H02J 50/001* (2020.01); *H01Q 9/0407* (2013.01); *H02J 50/005* (2020.01); *H02J 50/27* (2016.02)

(58) Field of Classification Search
None
See application file for complete search history.

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 1829999 A | 9/2006 |
| CN | 101401312 A | 4/2009 |

(Continued)

OTHER PUBLICATIONS

Energous Corp., ISRWO, PCT/US2014/037072, Sep. 12, 2014, 8 pgs.
(Continued)

*Primary Examiner* — Jared Fureman
*Assistant Examiner* — Joel Barnett
(74) *Attorney, Agent, or Firm* — Perkins Coie LLP; Colin M. Fowler

(57) ABSTRACT

A wireless-power harvester integrated in a small device, comprising a stamped metal harvesting antenna. The stamped metal antenna is formed into a meandering shape. A first end of the meandering shape is a free end positioned within free space of a housing of a small device, and a second end of the meandering shape is coupled to a PCB that includes electrical components for operating and powering the small device. The PCB is configured to operate as a ground plane for the stamped metal antenna. An intermediate portion, disposed between the first end and the second end of the meandering shape, is coupled to power-conversion circuitry that is separate from the PCB. The power-conversion circuitry is configured to convert the one or more RF power waves harvested by the stamped metal harvesting antenna into usable energy for charging a battery of the small device or for powering the small device.

14 Claims, 16 Drawing Sheets

Related U.S. Application Data

(60) Provisional application No. 63/294,555, filed on Dec. 29, 2021.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Itoh et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 10/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Ungari et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |

(56) References Cited

U.S. PATENT DOCUMENTS

| | | |
|---|---|---|
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,201 B1 | 12/2017 | Leabman et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,859,758 B1 | 1/2018 | Leabman |
| 9,859,797 B1 | 1/2018 | Leabman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,941,754 B2 | 4/2018 | Leabman et al. |
| 9,948,135 B2 | 4/2018 | Leabman et al. |
| 9,954,374 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,875 B1 | 6/2018 | Leabman |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,116,170 B1 | 10/2018 | Leabman |

(56) References Cited

U.S. PATENT DOCUMENTS

| | | |
|---|---|---|
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Leabman |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Kornaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,848,853 B2 | 11/2020 | Leabman et al. |
| 10,879,740 B2 | 12/2020 | Hosseini |
| 10,923,954 B2 | 2/2021 | Leabman |
| 10,958,095 B2 | 3/2021 | Leabman et al. |
| 10,965,164 B2 | 3/2021 | Leabman et al. |
| 10,985,617 B1 | 4/2021 | Johnston et al. |
| 10,992,185 B2 | 4/2021 | Leabman |
| 10,992,187 B2 | 4/2021 | Leabman |
| 11,011,942 B2 | 5/2021 | Liu |
| 11,018,779 B2 | 5/2021 | Sarajedini |
| 11,056,929 B2 | 7/2021 | Bell et al. |
| 11,114,885 B2 | 9/2021 | Hosseini et al. |
| 11,159,057 B2 | 10/2021 | Kabiri et al. |
| 11,218,795 B2 | 1/2022 | Leabman et al. |
| 11,233,425 B2 | 1/2022 | Leabman |
| 11,245,191 B2 | 2/2022 | Kornaros et al. |
| 11,245,289 B2 | 2/2022 | Johnston et al. |
| 11,342,798 B2 | 5/2022 | Johnston et al. |
| 11,355,966 B2 | 6/2022 | Muryanto et al. |
| 11,411,437 B2 | 8/2022 | Johnston et al. |
| 11,437,735 B2 | 9/2022 | Papio-Toda et al. |
| 11,451,096 B2 | 9/2022 | Hoss |
| 11,463,179 B2 | 10/2022 | Sarajedini et al. |
| 11,469,629 B2 | 10/2022 | Jain et al. |
| 11,502,551 B2 | 11/2022 | Leabman |
| 11,515,732 B2 | 11/2022 | Contopanagos et al. |
| 11,539,243 B2 | 12/2022 | Katajamaki et al. |
| 11,594,902 B2 | 2/2023 | Johnston et al. |
| 11,637,456 B2 | 4/2023 | Kornaros et al. |
| 11,652,369 B2 | 5/2023 | Leabman et al. |
| 11,670,970 B2 | 6/2023 | Leabman |
| 11,689,045 B2 | 6/2023 | Leabman et al. |
| 11,699,847 B2 | 7/2023 | Contopanagos et al. |
| 11,710,987 B2 | 7/2023 | Johnston et al. |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brien et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0184705 A1 | 8/2006 | Nakajima |
| 2006/0199620 A1 | 9/2006 | Greene et al. |
| 2006/0238365 A1 | 10/2006 | Vecchione et al. |
| 2006/0252370 A1 | 11/2006 | Goossens et al. |

(56) References Cited

U.S. PATENT DOCUMENTS

| | | |
|---|---|---|
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes, IV et al. |
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0092161 A1 | 4/2011 | Dotan |
| 2011/0109167 A1 | 5/2011 | Park et al. |
| 2011/0115303 A1 | 5/2011 | Baarman et al. |

(56) References Cited

U.S. PATENT DOCUMENTS

| | | |
|---|---|---|
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0202289 A1 | 8/2011 | Kalantari Khandani |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222154 A1 | 9/2011 | Choi et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Wildmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Alexander |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153731 A9* | 6/2012 | Kirby .................. H02J 50/20 307/104 |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0188142 A1 | 7/2012 | Shashi et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tamai et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |

(56) References Cited

U.S. PATENT DOCUMENTS

| | | |
|---|---|---|
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Nergaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Miroshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0207893 A1 | 8/2013 | Liu et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak, III et al. |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |

(56) References Cited

U.S. PATENT DOCUMENTS

| | | |
|---|---|---|
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wynne et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002080 A1 | 1/2015 | Lang |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Jurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wik et al. |
| 2015/0028688 A1 | 1/2015 | Masaoka |
| 2015/0028694 A1 | 1/2015 | Leabman et al. |
| 2015/0028697 A1 | 1/2015 | Makino et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fujinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Arai et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162129 A1 | 6/2015 | Fujieda |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236515 A1 | 8/2015 | Yoshida et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |

(56) References Cited

U.S. PATENT DOCUMENTS

| | | |
|---|---|---|
| 2015/0288067 A1 | 10/2015 | Kwon et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340872 A1 * | 11/2015 | Franzon ............... H02J 50/402 307/104 |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126775 A1 | 5/2016 | Park et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0172890 A1 | 6/2016 | Jeong |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0204643 A1 | 7/2016 | Manova-Elssibony |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077734 A1 | 3/2017 | Nokkonen et al. |
| 2017/0077765 A1 | 3/2017 | Bell et al. |
| 2017/0077979 A1 | 3/2017 | Papa et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0187248 A1 * | 6/2017 | Leabman ............... H01Q 1/02 |
| 2017/0214277 A1 * | 7/2017 | Lee ............... F25D 27/005 |
| 2017/0214422 A1 | 7/2017 | Na et al. |
| 2017/0274787 A1 | 9/2017 | Salter et al. |
| 2017/0338695 A1 | 11/2017 | Port |
| 2018/0006611 A1 | 1/2018 | De Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0109146 A1 | 4/2018 | Meng et al. |
| 2018/0227018 A1 | 8/2018 | Moshfeghi |
| 2018/0262050 A1 | 9/2018 | Yankowitz |
| 2018/0262060 A1 | 9/2018 | Johnston |
| 2018/0269570 A1 | 9/2018 | Hosseini |
| 2018/0269715 A1 | 9/2018 | Hannigan et al. |
| 2018/0301934 A1 | 10/2018 | Prabhala et al. |
| 2018/0309314 A1 | 10/2018 | White, II et al. |
| 2018/0316391 A1 | 11/2018 | Hijikata |
| 2018/0343040 A1 | 11/2018 | Luzinski et al. |
| 2018/0375368 A1 | 12/2018 | Leabman et al. |
| 2019/0052979 A1 | 2/2019 | Chen et al. |
| 2019/0074862 A1 | 3/2019 | Wang et al. |
| 2019/0296586 A1 | 9/2019 | Moshfeghi |
| 2019/0326782 A1 | 10/2019 | Graham et al. |
| 2019/0386522 A1 | 12/2019 | Park et al. |
| 2019/0393729 A1 * | 12/2019 | Contopanagos ........ H02J 50/40 |
| 2019/0393928 A1 | 12/2019 | Leabman |
| 2020/0091608 A1 | 3/2020 | Alpman et al. |
| 2020/0112204 A1 | 4/2020 | Hosseini et al. |
| 2020/0235614 A1 | 7/2020 | Swan et al. |
| 2020/0244111 A1 | 7/2020 | Johnston et al. |
| 2020/0274397 A1 | 8/2020 | Hwang et al. |
| 2020/0295599 A1 | 9/2020 | Heinrich et al. |
| 2021/0034937 A1 * | 2/2021 | Shakedd ............ G08B 13/2485 |
| 2021/0273684 A1 | 9/2021 | Yeh et al. |

FOREIGN PATENT DOCUMENTS

| | | |
|---|---|---|
| CN | 101465471 A | 6/2009 |
| CN | 101496222 A | 7/2009 |
| CN | 201278367 Y | 7/2009 |
| CN | 101507044 A | 8/2009 |
| CN | 101630357 A | 1/2010 |
| CN | 101699709 A | 4/2010 |
| CN | 101803110 A | 8/2010 |
| CN | 102004442 A | 4/2011 |
| CN | 102027686 A | 4/2011 |

(56) References Cited

FOREIGN PATENT DOCUMENTS

| | | |
|---|---|---|
| CN | 102027690 A | 4/2011 |
| CN | 102089952 A | 6/2011 |
| CN | 102227884 A | 10/2011 |
| CN | 102292896 A | 12/2011 |
| CN | 102388406 A | 3/2012 |
| CN | 102474109 A | 5/2012 |
| CN | 202333847 U | 7/2012 |
| CN | 102630359 A | 8/2012 |
| CN | 102860037 A | 1/2013 |
| CN | 103036940 A | 4/2013 |
| CN | 103151848 A | 6/2013 |
| CN | 103155353 A | 6/2013 |
| CN | 103296767 A | 9/2013 |
| CN | 103339796 A | 10/2013 |
| CN | 103348563 A | 10/2013 |
| CN | 103594776 A | 2/2014 |
| CN | 103683443 A | 3/2014 |
| CN | 104040789 A | 9/2014 |
| CN | 203826555 U | 9/2014 |
| CN | 104090265 A | 10/2014 |
| CN | 104113814 A | 10/2014 |
| CN | 104167773 A | 11/2014 |
| CN | 104168043 A | 11/2014 |
| CN | 104347915 A | 2/2015 |
| CN | 104584449 A | 4/2015 |
| CN | 104617680 A | 5/2015 |
| CN | 104659927 A | 5/2015 |
| CN | 104718708 A | 6/2015 |
| CN | 105207373 A | 12/2015 |
| CN | 105491472 A | 4/2016 |
| CN | 105762946 A | 7/2016 |
| CN | 105765821 A | 7/2016 |
| CN | 105932407 A | 9/2016 |
| CN | 106329116 A | 1/2017 |
| CN | 107465273 A | 12/2017 |
| DE | 20016655 U1 | 2/2002 |
| DE | 102013216953 A1 | 2/2015 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | H 0410994 A | 1/1992 |
| JP | H 06327172 A | 11/1994 |
| JP | H 0837743 A | 2/1996 |
| JP | H 08103039 A | 4/1996 |
| JP | 2000323916 A | 11/2000 |
| JP | 2002209343 A | 7/2002 |
| JP | 2002319816 A | 10/2002 |
| JP | 2006157586 A | 6/2006 |
| JP | 2006178910 A | 7/2006 |
| JP | 2007043432 A | 2/2007 |
| JP | 2007135335 A | 5/2007 |
| JP | 2008092704 A | 4/2008 |
| JP | 2008167017 A | 7/2008 |
| JP | 2008295176 A | 12/2008 |
| JP | 2009071835 A | 4/2009 |
| JP | 2009525715 A | 7/2009 |
| JP | 2009201328 A | 9/2009 |
| JP | 2009247125 A | 10/2009 |
| JP | 2009253649 A | 10/2009 |
| JP | 2009290764 A | 12/2009 |
| JP | 2010104098 A | 5/2010 |
| JP | 2011083078 A | 4/2011 |
| JP | 2011514781 A | 5/2011 |
| JP | 2012016171 A | 1/2012 |
| JP | 2012023950 A | 2/2012 |
| JP | 2012095226 A | 5/2012 |
| JP | 2012157167 A | 8/2012 |
| JP | 2012170194 A | 9/2012 |
| JP | 2013500693 A | 1/2013 |
| JP | 2013027074 A | 2/2013 |
| JP | 2013511908 A | 4/2013 |
| JP | 2013099249 A | 5/2013 |
| JP | 2013162624 A | 8/2013 |
| JP | 2013169106 A | 8/2013 |
| JP | 2013243908 A | 12/2013 |
| JP | 2014011938 A | 1/2014 |
| JP | 2014501080 A | 1/2014 |
| JP | 2014075927 A | 4/2014 |
| JP | 2014112063 A | 6/2014 |
| JP | 2014135538 A | 7/2014 |
| JP | 2014176125 A | 9/2014 |
| JP | 2014176131 A | 9/2014 |
| JP | 2014179746 A | 9/2014 |
| JP | 2014217044 A | 11/2014 |
| JP | 2014223018 A | 11/2014 |
| JP | 2015027345 A | 2/2015 |
| JP | 2015128349 A | 7/2015 |
| JP | 2015128370 A | 7/2015 |
| JP | 2015139276 A | 7/2015 |
| JP | 2017034935 A | 2/2017 |
| JP | 2017073855 A | 4/2017 |
| JP | 2017077093 A | 4/2017 |
| JP | WO2015177859 A1 | 4/2017 |
| JP | 2017085682 A | 5/2017 |
| JP | WO2017056260 A1 | 10/2017 |
| KR | 20060061776 A | 6/2006 |
| KR | 20070044302 A | 4/2007 |
| KR | 100755144 B1 | 9/2007 |
| KR | 100819604 B1 | 4/2008 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140025410 A | 3/2014 |
| KR | 20140085200 A | 7/2014 |
| KR | 20140148270 A | 12/2014 |
| KR | 20150077678 A | 7/2015 |
| KR | 20160018826 A | 2/2016 |
| KR | 20160087671 A | 7/2016 |
| KR | 20170050971 A | 5/2017 |
| KR | 20180108317 A | 10/2018 |
| KR | 20180114721 A | 10/2018 |
| KR | 20190009237 A | 1/2019 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010116441 A1 | 10/2010 |
| WO | WO 2010138994 A1 | 12/2010 |
| WO | WO 2011112022 A2 | 9/2011 |
| WO | WO 2012153529 A1 | 11/2012 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013088238 A2 | 6/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |

(56) References Cited

FOREIGN PATENT DOCUMENTS

| WO | WO 2014132258 A1 | 9/2014 |
| WO | WO 2014134996 A1 | 9/2014 |
| WO | WO 2014156465 A1 | 10/2014 |
| WO | WO 2014170773 A2 | 10/2014 |
| WO | WO 2014171348 A1 | 10/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016013944 A1 | 1/2016 |
| WO | WO 2016024869 A1 | 2/2016 |
| WO | WO 2016048512 A1 | 3/2016 |
| WO | WO 2016057115 A1 | 4/2016 |
| WO | WO 2016088261 A1 | 6/2016 |
| WO | WO 2016187357 A1 | 11/2016 |
| WO | WO 2017112942 A1 | 6/2017 |
| WO | WO 2018203176 A1 | 11/2018 |
| WO | WO 2018208130 A1 | 11/2018 |
| WO | WO 2019012372 A1 | 1/2019 |
| WO | WO 2019078660 A1 | 4/2019 |

OTHER PUBLICATIONS

Energous Corp., Isrwo, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2014/041546, Oct. 16, 2014, 12 pgs.
Energous Corp., ISRWO, PCT/US2014/041534, Oct. 13, 2014, 10 pgs.
Energous Corp., ISRWO, PCT/US2014/046956, Nov. 12, 2014, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/046941, Nov. 6, 2014, 11 pgs.
Energous Corp., ISRWO, PCT/US2014/062672, Jan. 26, 2015, 11 pgs.
Energous Corp., ISRWO, PCT/US2014/040648, Oct. 10, 2014, 11 pgs.
Energous Corp., ISRWO, PCT/US2014/041323, Oct. 1, 2014, 10 pgs.
Energous Corp., ISRWO, PCT/US2014/044810 Oct. 21, 2014, 12 pgs.
Energous Corp., ISRWO, PCT/US2014/041558, Oct. 10, 2014, 8 pgs.
Energous Corp., ISRWO, PCT/US2014/041342, Jan. 27, 2015, 10 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO, PCT/US2014/045237, Oct. 13, 2014, 16 pgs.
Energous Corp., ISRWO, PCT/US2014/045102, Oct. 28, 2014, 14 pgs.
Energous Corp., ISRWO, PCT/US2014/046961, Nov. 24, 2014, 16 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/047963, Nov. 7, 2014, 13 pgs.
Energous Corp., ISRWO, PCT/US2014/049666, Nov. 10, 2014, 7 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067250, Mar. 30, 2016, 11 pgs.
Energous Corp., IPRP, PCT/US2015/067250, Mar. 30, 2016, 10 pgs.
Energous Corp., ISRWO, PCT/US2015/067271, Mar. 11, 2016, 6 pgs.
Energous Corp., IPRP, PCT/US2015/067271, Jul. 4, 2017, 5 pgs.
Energous Corp., ISRWO, PCT/US2015/067275, Mar. 3, 2016, 8 pgs.
Energous Corp., Iprp, PCT/US2015/067275, 04JUL2017, 7 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.

(56) References Cited

OTHER PUBLICATIONS

Energous Corp., ISRWO, PCT/US2015/067294, Mar. 29, 2016, 7 pgs.
Energous Corp., IPRP, PCT/US2015/067294, Jul. 4, 2017, 6 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2015/067334, Mar. 3, 2016, 6 pgs.
Energous Corp., IPRP, PCT/US2015/067334, Jul. 4, 2017, 5 pgs.
Energous Corp., ISRWO, PCT/US2016/068495, Mar. 30, 2017, 9 pgs.
Energous Corp., IPRP, PCT/US2016/068495, Jun. 26, 2018, 7 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068987, May 8, 2017, 10 pgs.
Energous Corp., IPRP, PCT/US2016/068987, Jul. 3, 2018, 7 pgs.
Energous Corp., ISRWO, PCT/US2016/068993, Mar. 13, 2017, 12 pgs.
Energous Corp., IPRP, PCT/US2016/068993, Jul. 3, 2018, 10 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., IPRP, PCT/US2017/046800, Feb. 12, 2019, 10 pgs.
Energous Corp., ISRWO, PCT/US2017/065886, Apr. 6, 2018, 13 pgs.
Energous Corp., IPRP, PCT/US2017/065886, Jun. 18, 2019, 10 pgs.
Energous Corp., ISRWO, PCT/US2018/012806, Mar. 23, 2018, 9 pgs.
Energous Corp., IPRP, PCT/US2018/012806, Jul. 9, 2019, 6 pgs.
Energous Corp., ISRWO, PCT/US2018/025465, Jun. 22, 2018, 9 pgs.
Energous Corp., IPRP, PCT/US2018/025465, Oct. 1, 2019, 8 pgs.
Energous Corp., ISRWO, PCT/US2018/064289, Apr. 25, 2019, 12 pgs.
Energous Corp., ISRWO, PCT/US2018/031768, Jul. 3, 2018, 9 pgs.
Energous Corp., IPRP, PCT/US2018/031768, Nov. 12, 2019, 8 pgs.
Energous Corp., ISRWO, PCT/US2018/039334, Sep. 11, 2018, 9 pgs.
Energous Corp., IPRP, PCT/US2018/039334, Dec. 24, 2019, 8 pgs.
Energous Corp., ISRWO, PCT/US2018/051082, Dec. 12, 2018, 9 pgs.
Energous Corp., IPRP, PCT/US2018/051082, Mar. 17, 2020, 9 pgs.
Energous Corp., ISRWO, PCT/US2018/031786, Aug. 8, 2018, 9 pgs.
Energous Corp., IPRP, PCT/US2018/031786, Apr. 14, 2020, 7 pgs.
Energous Corp., ISRWO, PCT/US2019/021817, Apr. 6, 2019, 11 pgs.
Energous Corp., IPRP, PCT/US2019/021817, Sep. 15, 2020, 7 pgs.
Energous Corp., ISRWO, PCT/US2018/058178, Mar. 13, 2019, 10 pgs.
Energous Corp., IPRP, PCT/US2018/058178, May 5, 2020, 7 pgs.
Energous Corp., ISRWO, PCT/US2019/015820, May 14, 2019, 9 pgs.
Energous Corp., IPRP, PCT/US2019/015820, Aug. 4, 2020, 7 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/067566, Apr. 27, 2021, 12 pgs.
Energous Corp., IPRP, PCT/US2020/067566, Jul. 5, 2022, 8 pgs.
Energous Corp., ISRWO, PCT/US2020/064592, Mar. 24, 2021, 10 pgs.
Energous Corp., IPRP, PCT/US2020/064592, May 17, 2022, 7 pgs.
Energous Corp., ISRWO, PCT/US2021/027140, Jul. 21, 2021, 9 pgs.
Energous Corp., IPRP, PCT/US2021/027140, Oct. 13, 2022, 5 pgs.
Energous Corp., ISRWO, PCT/US2021/045269, Dec. 7, 2021, 7 pgs.
Energous Corp., IPRP, PCT/US2021/045269, Feb. 7, 2023, 7 pgs.
Energous Corp., ISRWO, PCT/US2021/061430, Apr. 6, 2022, 10 pgs.
Energous Corp., IPRP, PCT/US2021/061430, May 30, 2023, 7 pgs.
Energous Corp., ISRWO, PCT/US2021/062452, Mar. 29, 2022, 11 pgs.
Energous Corp., IPRP, PCT/US2021/062452, Jun. 13, 2023, 7 pgs.
Energous Corp., ISRWO, PCT/US2022/054108, May 4, 2023, 11 pgs.
Energous Corp., ISRWO, PCT/US2020/027409, Jul. 24, 2020, 11 pgs.
Energous Corp., IPRP, PCT/US2020/027409, Sep. 28, 2021, 7 pgs.
Order Granting Reexamination Request, U.S. Appl. No. 90/013,793 Aug. 31, 2016, 23 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
Notice of Intent to Issue Reexam Certificate: U.S. Appl. No. 90/013,793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
Extended European Search Report, EP20909157.8, Sep. 15, 2023, 9 pgs.
Adamiuk et al., "Compact, Dual-Polarized UWB-Antenna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop, 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.

(56) References Cited

OTHER PUBLICATIONS

Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.

Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.

Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.

Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.

Van Veen et al., "Beamforming: A Versatile Approach to Spatial Filtering", IEEE, ASSP Magazine, Apr. 1988, pp. 4-24.

Wei et al., "Design of a Wideband Horizontally Polarized Omnidirectional Printed Loop Antenna," IEEE Antennas and Wireless Propagation Letters, vol. 11, Jan. 3, 2012, 4 pgs.

Zeng et al., "A Compact Fractal Loop Rectenna for RF Energy Harvesting," IEEE Antennas And Wireless Propagation Letters, vol. 16, Jun. 26, 2017, 4 pgs.

Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

\* cited by examiner

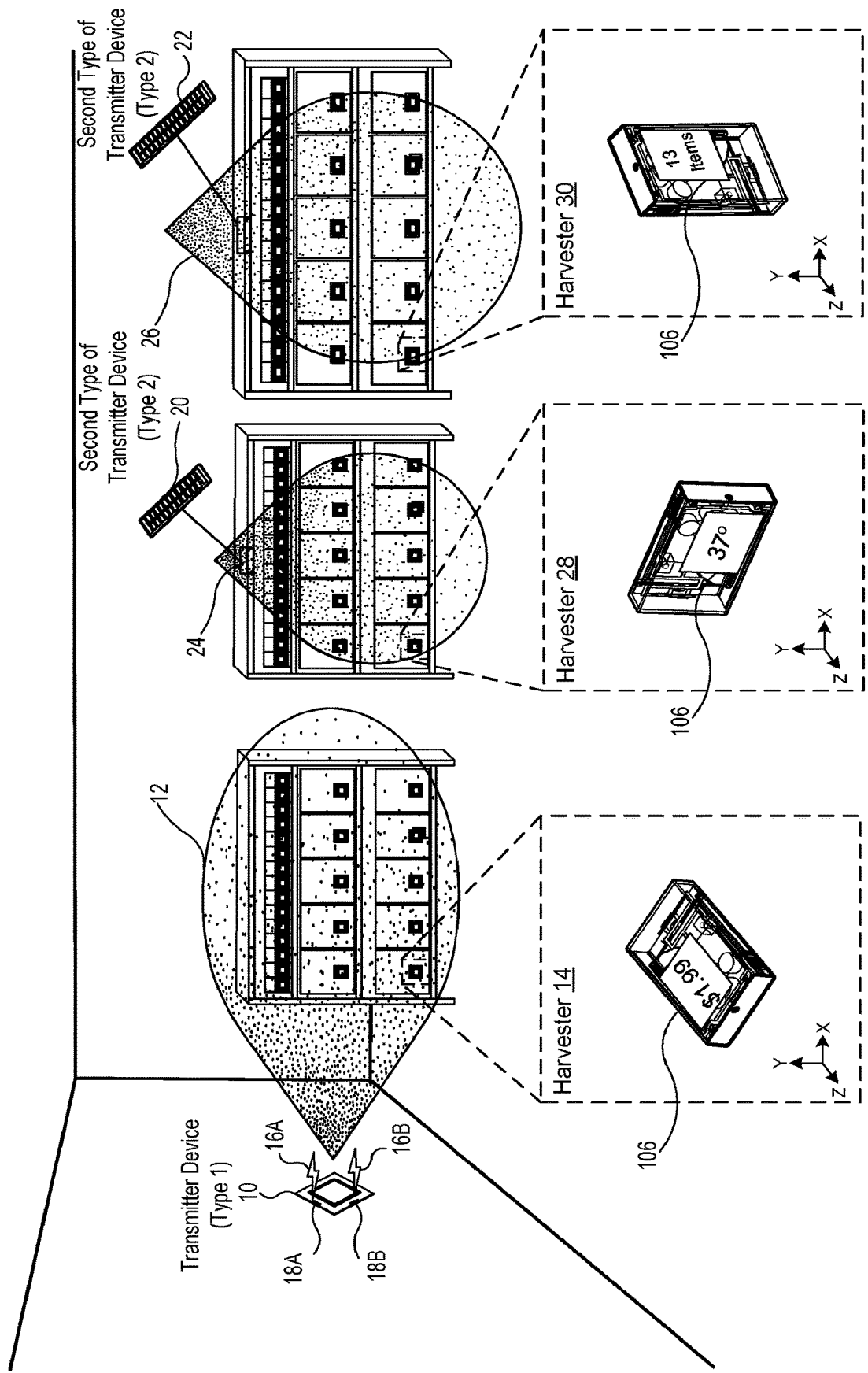

SMALL FORM-FACTOR DEVICES WITH INTEGRATED AND MODULAR HARVESTING RECEIVERS, AND SHELVING-MOUNTED WIRELESS-POWER TRANSMITTERS FOR USE THEREWITH

RELATED APPLICATIONS

This application is a continuation of U.S. patent application Ser. No. 18/146,314, filed on Dec. 23, 2022, entitled "Small Form-Factor Devices With Integrated And Modular Harvesting Receivers, And Shelving-Mounted Wireless-Power Transmitters For Use Therewith," which is application claims priority to U.S. Provisional Application Ser. No. 63/294,555 filed on Dec. 29, 2021, entitled "Systems For Harvesting Radio Frequency Wireless Power Using One Or More Of Shelving-Mounted Wireless-Power Transmitters, Small Form-Factor Devices With Integrated And Modular Harvesting Receivers, And Wireless-Power Transmitters Capable Of Providing Data And Power Signals In Multiple Orientations," each of which is herein fully incorporated by reference in its respective entirety.

TECHNICAL FIELD

The present disclosure relates generally to systems for harvesting radio-frequency wireless power and, in particular, to systems for harvesting RF wireless power using small-from factor devices with integrated and module harvesting receivers (e.g., the small form-factor devices can be digital price tags or small digital devices used to identify product information in warehousing settings) and shelving-mounted wireless-power transmitters. Some systems also include wireless-power transmitters capable of providing data and power signals in multiple orientations (these additional transmitters can replace or supplement the shelving-mounted wireless-power transmitters).

BACKGROUND

Harvesting energy (e.g., ambient energy or energy transmitted with the intention that it be harvested by a receiver) to charge devices is gaining additional attention.

Some harvesting systems require specific placements and orientations of the harvesting receiver relative to a transmitter to obtain sufficient power to make the system useful. Additionally, these systems can be tailor-made for specific electronic devices and/or charging environments, and thus have limited flexibility. Such devices are therefore poorly suited to changing environments (e.g., being moved around), environments with a variety of differing charging requirements, and struggle with devices that might have various different orientations relative to a transmitting device (both for transmitting and receiving power and data signals).

Some harvesting systems also rely on the use of active beam-forming control techniques that require formation of multiple beams of energy, in which beams are formed to create focused energy in an operational area. To create this focused energy, many existing solutions use beam-forming, e.g., controlling phase and other waveform characteristics to produce constructive and/or destructive interference patterns to focus power beams onto a device at a certain location. Beam-forming typically requires multiple antennas, beam-forming algorithm control circuitry and/or algorithms, and multiple power amplifiers, all of which add complexity to the system, and add to overall system costs.

As such, it would be desirable to provide systems and methods for wirelessly transmitting and harvesting wireless power that address the above-mentioned drawbacks.

SUMMARY

The wireless-power transmission and harvesting system described herein solves one or more of the problems identified above by making use of one or more of three primary embodiments: (i) an RF harvesting receiver that is configured to receive radiated wireless power in multiple different orientations and which includes modular components that can be easily replaced and which are integrated with a small form-factor device (such as a digital price tag); (ii) shelving-mounted wireless-power transmitters, and (iii) wireless-power transmitters capable of providing data and power signals in multiple orientations. As one example pertaining to the second embodiment, the shelving-mounted transmitter can include a radiating antenna element that can be designed with varying numbers of conductive segments. By adjusting the number of conductive segments (which can be done at manufacture time or which can be done on-the-fly using switches or like structures to activate or disable certain conductive segments), the coverage area of a particular shelving-mounted transmitter can be adjusted. This is convenient for applications where the coverage area is not standard across all areas of an environment (e.g., an environment including multiple shelving units in a grocery store or an environment including storage shelves in a warehouse, and the like) and can fluctuate in different areas of the environment such that different required coverage areas are needed (e.g., a coverage area for multiple different shelving units in a store, or various storage shelves used in large warehouse settings). As one example with respect to the third embodiment, the RF transmitter can be configured to radiate RF signals with a circular polarization while concurrently radiating communications signals in a dual linear fashion (e.g., one data antenna can radiate data signals with a horizontal polarization and another perpendicularly-oriented data antenna can radiate data signals with a vertical polarization). Additionally, integrating multi-orientation data and power signals in a transmitter enables further control of the receiving devices. In one example, where the receiving device is an inventory tag, the electronic device can be updated easily to reflect changes in inventory or price. Examples of these improvements are discussed in detail below, which provide solutions to one or more of the problems discussed earlier.

Additionally, any of the embodiments described herein can utilize transmission techniques that do not require any active beam-forming control (e.g., a single antenna can be utilized with a single power amplifier to allow for wirelessly delivering energy to a harvester device), thereby producing efficient systems with fewer components.

(A1) In accordance with some embodiments, a wireless-power harvester is integrated in a small form-factor device. The wireless-power harvester comprises a stamped metal harvesting antenna configured to harvest radio frequency (RF) power waves, the stamped metal antenna formed into a meandering shape. The meandering shape includes a predetermined number of turns. The first end of the meandering shape is a free end positioned within free space of a housing of a small form-factor device, and the second end of the meandering shape is coupled to a PCB that includes electrical components for operating and powering the small form-factor device. The PCB is configured to operate as a ground plane for the stamped metal antenna. An intermediate portion is disposed between the first end and the second end of the meandering shape coupled to power-conversion circuitry that is separate from the PCB. The power-conversion circuitry is configured to convert the one or more RF power waves, harvested by the stamped metal harvesting antenna, into usable energy for charging a battery of the small form-factor device or for powering the small form-factor device.

(A2) In some embodiments of A1, the small form-factor device is a digital price tag that includes a display powered by the battery. The display and the battery are coupled to the PCB.

(A3) In some embodiments of any of A1-A2, the small form-factor device is a digital thermometer powered by the battery.

(A4) In some embodiments of any of A1-A3, the power-conversion circuitry is on a substrate distinct from the PCB.

(A5) In some embodiments of any of A1-A4, the stamped metal harvesting antenna is quasi omnidirectional.

(A6) In some embodiments of any of A1-A5, the stamped metal harvesting antenna is coupled to an edge of the PCB.

(A7) In some embodiments of any of A1-A6, the stamped metal harvesting antenna is modular, such that it can be interchangeably coupled with the PCB and the power-conversion circuitry at a first point in time, and separately coupled with a different PCB of a different small form-factor device and different power-conversion circuitry at a second point in time that is distinct from the first point in time.

(A8) In some embodiments of any of A1-A7, the stamped metal antenna occupies a first area of the housing of the small form-factor device that is adjacent to a second area of the housing occupied by the PCB, and the first and second areas are non-overlapping.

(A9) In some embodiments of any of A1-A8, the RF power waves have a centering operating frequency of 918 MHz.

(A10) In some embodiments of any of A1-A9, the stamped metal harvesting antenna has a gain of at least 2 dB.

(A11) In some embodiments of any of A1-A10, the predetermined number of turns is two.

(A12) In some embodiments of any of A1-A11, the battery has a capacity of 60 to 100 mAh.

(A13) In some embodiments of any of A1-A12, the stamped metal harvesting antenna has a thickness of 60 mils (about 1.5 mm).

(A14) In some embodiments of any of A1-A13, the stamped metal harvesting antenna has a width of around 1 inch.

(A15) In some embodiments of any of A1-A14, the small form-factor device includes a communications component that is coupled to the PCB, the communications component configured to receive data that allows the small form-factor device to display graphical information.

(A16) In some embodiments of any of A1-A15, the graphical information is displayed using a text-only display of the small form-factor device.

(B1) In another aspect, a small form-factor device, comprises a wireless-power harvester. The wireless-power harvester includes a stamped metal harvesting antenna configured to harvest radio frequency (RF) power waves, the stamped metal antenna formed into a meandering shape. The meandering shape includes a predetermined number of turns. A first end of the meandering shape is a free end positioned within free space of a housing of a small form-factor device, and a second end of the meandering shape is coupled to a PCB that includes electrical components for operating and powering the small form-factor device. The PCB is configured to operate as a ground plane for the stamped metal antenna. An intermediate portion, disposed between the first end and the second end, of the meandering shape is coupled to power-conversion circuitry that is separate from the PCB. The power-conversion circuitry is configured to convert the one or more RF power waves harvested by the stamped metal harvesting antenna into usable energy for charging a battery of the small form-factor device or for powering the small form-factor device. The wireless-power harvester of the small form-factor device of B1 can be configured in accordance with any of A2-A16. A method of operating the wireless-power harvester of any of claims A1-A16 and or the small form-factor device that includes the harvester is also contemplated, the method operates the harvester to allow it to harvest radio-frequency wireless-power waves, which are then converted to usable energy for power or charging the small form-factor device.

(C1) In another aspect, a shelving-mounted wireless-power-transmitting and receiving system comprises a shelving-mounted wireless-power-transmitting device. The shelving-mounted wireless-power-transmitting device is configured to transmit RF power waves to a wireless-power harvester device that is integrated in a small form-factor device. The wireless-power harvester device integrated in the small form-factor device includes a stamped metal harvesting antenna configured to harvest radio frequency (RF) power waves, the stamped metal antenna formed into a meandering shape. The meandering shape includes a predetermined number of turns. A first end of the meandering shape is a free end positioned within free space of a housing of a small form-factor device, and a second end of the meandering shape is coupled to a PCB that includes electrical components for operating and powering the small form-factor device. The PCB configured to operate as a ground plane for the stamped metal antenna. An intermediate portion, disposed between the first end and the second end, of the meandering shape is power-conversion circuitry that is separate from the PCB. The power-conversion circuitry is configured to convert the one or more of the RF power waves harvested by the stamped metal harvesting antenna into usable energy for charging a battery of the small form-factor device or for powering the small form-factor device.

(C2) In some embodiments of C1, the shelving-mounted wireless-power-transmitting device comprises a mounting structure that is mountable to a shelving unit, the shelving unit having a predetermined height and a predetermined width. The mounting includes a first end coupled to an outer portion of the shelving unit and a second end opposite the first end extending a predetermined distance away from the outer portion of the shelving unit. The second end includes: a ground plane, a first plurality of conductive segments having a first shape and a first size, each of the first plurality of conductive segments disposed over the ground plane. The second end includes a second plurality of conductive segments having a second shape and a second size, the second shape being distinct from the first shape and the second size being distinct from the first size. A respective conductive segment of the second plurality of conductive segments separates adjacent conductive segments of the first plurality of conductive segments from one another. The second end includes the first and second pluralities of conductive segments being disposed over the ground plane to form an antenna that is configured to radiate radio-frequency (RF) wireless power waves towards the shelving unit such that (i) the predetermined height and the predetermined width of the shelving unit are within a coverage area of the RF wireless power waves, and (ii) a bottom shelf of the shelving unit receives at least a threshold amount of RF energy from the RF wireless power waves. The harvester of C1 or C2 can be configured in accordance with any of A2-A16, and the wireless-power transmitting device can be configured in accordance with any of D2-D11.

(D1) In another aspect, a shelving-mounted wireless-power-transmitting device comprises a mounting structure that is mountable to a shelving unit, the shelving unit having a predetermined height and a predetermined width. The mounting includes a first end coupled to an outer portion of the shelving unit and a second end opposite the first end extending a predetermined distance away from the outer portion of the shelving unit. The second end includes a ground plane, and a first plurality of conductive segments having a first shape and a first size, a second plurality of conductive segments having a second shape and a second size, the second shape being distinct from the first shape and the second size being distinct from the first size. The second end includes a respective conductive segment of the second plurality of conductive segments separates adjacent conductive segments of the first plurality of conductive segments from one another. The second end includes the first and second pluralities of conductive segments being disposed over the ground plane to form an antenna that is configured to radiate radio-frequency (RF) wireless power waves towards the shelving unit such that (i) the predetermined height and the predetermined width of the shelving unit are within a coverage area of the RF wireless power waves, and (ii) a bottom shelf of the shelving unit receives at least a threshold amount of RF energy from the RF wireless power waves.

(D2) In some embodiments of D1, each conductive segment of the first plurality of conductive segments and the second plurality of conductive segments are separated by a predetermined gap.

(D3) In some embodiments of any of D1-D2, the first shape and the second shape is a meandering path that produces a rectangular shape.

(D4) In some embodiments of any of D1-D3, the first size is larger than the second size.

(D5) In some embodiments of any of D1-D4, the first plurality conductive segments and the second plurality of conductive segments each include a predetermined number of two or more conductive segments.

(D6) In some embodiments of any of D1-D5, the outer portion of the shelving unit is a centrally located between two posts of the shelving unit.

(D7) In some embodiments of any of D1-D6, respective numbers of segments in the first and second pluralities of conductive segments are adjustable to allow for creating an altered coverage area for the shelving-mounted wireless-power transmitting device.

(D8) In some embodiments of any of D1-D7, a peak gain of the antenna is at least 5.5 dBi and the wireless power waves are radiated using a center operating frequency of 918 MHz.

(D9) In some embodiments of any of D1-D8, the first plurality of conductive segments and the second plurality of conductive segments are formed using respective stamped copper plates.

(D10) In some embodiments of any of D1-D9, the first plurality of conductive segments includes a first number of conductive segments, the first number of conductive segments selected based on the predetermined height and width of the shelving unit. The second plurality of conductive segments includes a second number of conductive segments, the second number also selected based on the predetermined height and width of the shelving unit.

(D11) In some embodiments of any of D1-D10, the shelving-mounted wireless-power-transmitting device further comprises a second mounting structure that is mountable to a second shelving unit, the second shelving unit having a larger width and height than the predetermined height and width of the shelving unit, and the second mounting structure having a ground plane. The shelving-mounted wireless-power-transmitting device further comprises a third plurality of conductive segments with each adjacent conductive segment of the third plurality is separated by a conductive segment of a fourth plurality of conductive segments. The third and fourth pluralities of conductive segments are disposed over the ground plane to form a second antenna that is configured to radiate second RF wireless power waves towards the second shelving unit such that the larger width and height of the second shelving unit is with a second coverage area of the second RF wireless power waves. A third number of conductive segments in the third plurality of conductive segments is larger than the first number of conductive segments and a fourth number of conductive segments in the fourth plurality of conductive segments is larger than the second number of conductive segments, and the second coverage area is larger than the coverage area.

(E1) In another aspect, a wireless-power-transmitting device, includes a backplane that includes a radio frequency (RF) wireless-power antenna that is configured to radiate wireless power waves using a first frequency band. The RF wireless-power antenna has a perimeter that is within a perimeter of the backplane. In some embodiments, the backplane includes a first data-communications antenna configured to transmit data signals using a second frequency band distinct from the first frequency band, and the first data-communications antenna being coupled to the backplane such that it is outside of a first edge of the perimeter of the RF wireless-power antenna. The backplane includes a second data-communications antenna configured to transmit data signals using the second frequency band, and the second data-communications antenna is coupled to the backplane such that it is outside of a second edge of the perimeter of the RF wireless-power antenna. The second edge of the perimeter of the RF wireless-power antenna is perpendicular to the first edge of the perimeter of the RF wireless-power antenna.

(E2) In some embodiments of E1, the wireless-power-transmitting device includes a spacer that is coupled between the RF wireless-power antenna and the backplane such that the RF wireless-power antenna is coupled to the spacer and sits above the backplane.

(E3) In some embodiments of any of E1-E2, the RF wireless-power antenna is circularly polarized such that the wireless power waves using the first frequency band are transmitted having a circular polarization.

(E4) In some embodiments of any of E1-E3, the first data communication antenna has a first polarization and the second communication antenna has a second polarization that is different from the first polarization.

(E5) In some embodiments of any of E1-E4, the first and second edges of the RF wireless-power antenna are separated by a third notched edge that separates the first and second edges and is shorter in length than the first and second edges, such that the RF wireless-power antenna has a generally quadrilateral shape with at least one notched edge removed from a corner of the quadrilateral.

(E6) In some embodiments of any of E1-E5, the RF wireless-power antenna has two notched edges, the two notched edges being symmetrically shaped.

(E7) In some embodiments of any of E1-E6, the first communication antenna is placed in a middle of the first edge of the perimeter of the RF wireless-power antenna, and the second communication antenna is placed in a middle of the second edge of the perimeter of the RF wireless-power antenna.

(E8) In some embodiments of any of E1-E7, the RF wireless-power antenna is a patch antenna.

(E9) In some embodiments of any of E1-E8, the patch antenna is constructed of copper material.

(E10) In some embodiments of any of E1-E9, a peak gain of the RF wireless-power antenna is greater than 8 dBi while the first frequency band is a center frequency band of 918 MHz.

(E11) In some embodiments of any of E1-E10, the wireless-power antenna matching is less than −10 dB.

(E12) In some embodiments of any of E1-E11, the first data-communications antenna and the second data-communications antenna produce a peak gain of 5 dBi while operating at the second frequency band of approximately 2.45 GHz.

(E13) In some embodiments of any of E1-E12, the first data-communications antenna and the second data-communications antenna have a matching of greater than −7 dB.

(E14) In some embodiments of any of E1-E13, the RF frequency wireless power antenna improves the gain of both the first data-communications antenna and the second data-communications antenna as a result of their proximity to the wireless-power antenna.

(E15) In some embodiments of any of E1-E14, the first data-communications antenna and the second data-communications antenna use the RF frequency wireless power antenna and a main ground to provide maximum gain and optimum radiation performance of the first data-communications antenna and the second data-communications antenna.

(E16) In some embodiments of any of E1-E15, the first data-communications antenna and the second data-communications antenna are formed using respective stamped copper plates.

(E17) In some embodiments of any of E1-E16, the first data-communications antenna and the second data-communications antenna are each suspended 0.1 to 0.5 inches from a top surface of the backplane.

(F1) In another aspect, a wireless-power transmitting and receiving system, includes a plurality of wireless power-transmitting devices including any of the shelving-mounted wireless power transmitting devices of D1-D11 or the wireless-power transmitting device of any of E1-E16, or both, a plurality of wireless-power harvesters structured in accordance with any of A1-A16, B1, and C1-C2.

(G1) In another aspect, a method of manufacturing a wireless-power device comprises providing a backplane is performed. The method comprises disposing, on the backplane, a radio frequency (RF) wireless-power antenna that is configured to radiate wireless power waves using a first frequency band, the RF wireless-power antenna having a perimeter that is within a perimeter of the backplane. The method also comprises coupling a first data-communications antenna to the backplane such that it is outside of a first edge of the perimeter of the RF wireless-power antenna. The first data-communications antenna transmits data signals using a second frequency band distinct from the first frequency band. The method further comprises coupling a second data-communications antenna to the backplane such that it is outside of a second edge of the perimeter of the RF wireless-power antenna. The second edge of the perimeter of the RF wireless-power antenna is perpendicular to the first edge of the perimeter of the RF wireless-power antenna. The second data-communications antenna transmits data signals using the second frequency band.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. As one of skill will appreciate upon reading this disclosure in conjunction with the figures, the description may admit or contemplate other features.

FIG. 1 illustrates an example environment (e.g., a warehouse) that includes multiple of the wireless-power-transmitting devices described here and multiple wireless-power receivers that have different orientations but still harvest sufficient power, in accordance with some embodiments.

Figure 1A:
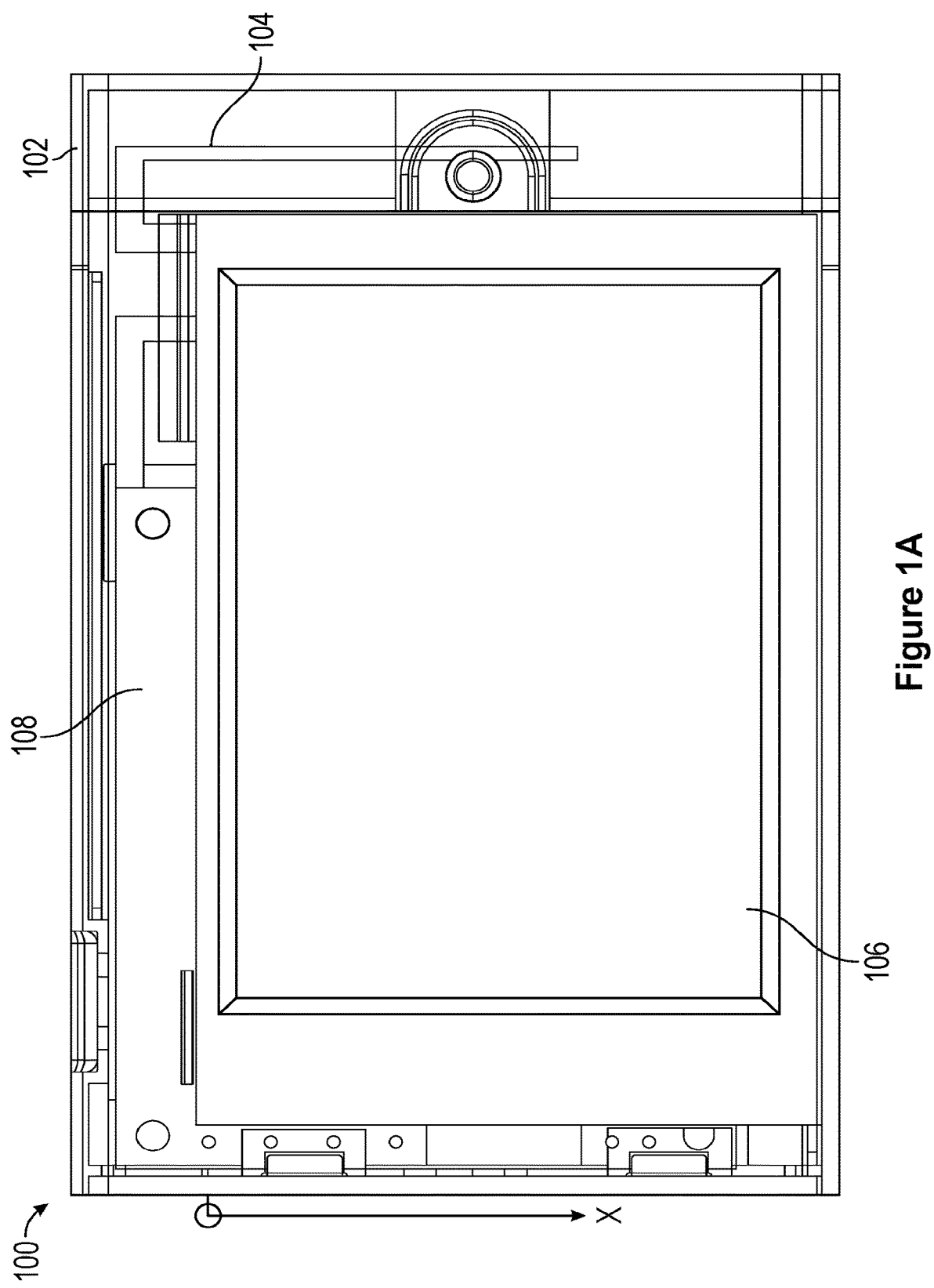
FIGS. 1A and 1B illustrate different views of a wireless-power harvester integrated in an electronic device, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

The transmitter device (also referred to as a wireless-power transmitter device or wireless-power transmitter below) can be an electronic device that includes, or is otherwise associated with, various components and circuits responsible for, e.g., generating and transmitting electromagnetic energy, forming transmission energy within a radiation profile at locations in a transmission field, monitoring the conditions of the transmission field, and adjusting the radiation profile where needed. The radiation profile described herein refers to a distribution of energy field within the transmission range of a transmitter device or an individual antenna (also referred to as a "transmitter"). A receiver (also referred to as a wireless-power receiver) can be an electronic device that comprises at least one antenna, at least one rectifying circuit, and at least one power converter, which may utilize energy transmitted in the transmission field from a transmitter for powering or charging the electronic device.

FIG. 1 illustrates an example set-up of a combination of (i) a plurality of wireless-power harvester devices that are configured to receive radiated wireless power in multiple different orientations and include modular components that can be easily replaced and which are integrated with a small form-factor device (such as a digital price tag); (ii) a plurality of shelving-mounted wireless-power transmitters, and (iii) a wireless-power transmitters capable of providing data and power signals in multiple orientations.

As stated above, FIG. 1 illustrates two types of wireless-power transmitters configured to radiate RF signals to wireless-power harvester devices. Wireless-power transmitter 10 illustrates a first type of wireless-power transmitter that can be placed on walls, ceilings, or any other supporting structure within a building. The wireless-power transmitter is configured to emit RF wireless-power waves 12 to wireless-power harvester devices (e.g., wireless-power harvester device 14) and is also configured to emit data-communication signals 16A and 16B (unilaterally and bidirectionally) to one or more wireless-power harvester devices (e.g., wireless-power harvester device 14) using communication antennas 18A and 18B (e.g., BLE antennas). Wireless-power harvester device 14, while shown in a certain orientation, can be placed in any other orientation and still receive sufficient power (e.g., enough power to enable the harvester to provide usable power to power or charge an associated small form-factor electronic device, which can be a digital price tag in some embodiments), due in part to the circular polarization of the RF wireless-power waves. Additionally, the wireless-power harvester device 14 can also receive data-communication signals having any orientation, due to the dual linear polarization of the data-communication signals that allows those data-communication signals to be transmitted with both horizontal and vertical polarizations. Further details regarding the first type of wireless-power transmitter are discussed below in reference to FIG. 8. Further details regarding the wireless-power harvester device are discussed in reference to FIGS. 1A-4.

Shelving-mounted wireless-power transmitters 20 and 22 are a second type of wireless-power transmitter. These shelving-mounted wireless-power transmitters can be manufactured or dynamically adjusted to have different numbers of conductive segments in their respective antennas to adjust emission profiles for RF wireless-power waves. FIG. 1 shows shelving-mounted wireless-power transmitter 20 having a first number of conductive segments, which results in emission of RF power waves 24 to wireless-power harvester devices (e.g., wireless-power harvester device 28). Shelving-mounted wireless-power transmitter 22 has a second number of conductive segments, which results in emission of RF power waves 26 to wireless-power harvester devices (e.g., wireless-power harvester device 30). Wireless-power harvester devices 28 and 30, while shown in a certain orientations, can be placed in any other orientation and still receive sufficient power. Additionally, the wireless-power harvester devices 28 and 30 can also receive data-communication signals in any orientation. In some embodiments, it is also possible for the wireless-power harvester devices to harvest additional RF power waves from other nearby wireless-power transmitters (e.g., wireless-power transmitter 10). Further detail of the second type of wireless-power transmitter is discussed in reference to FIG. 5-7. Further detail regarding the wireless-power harvester device is discussed in reference to FIGS. 1A-4.

Figure 1B:
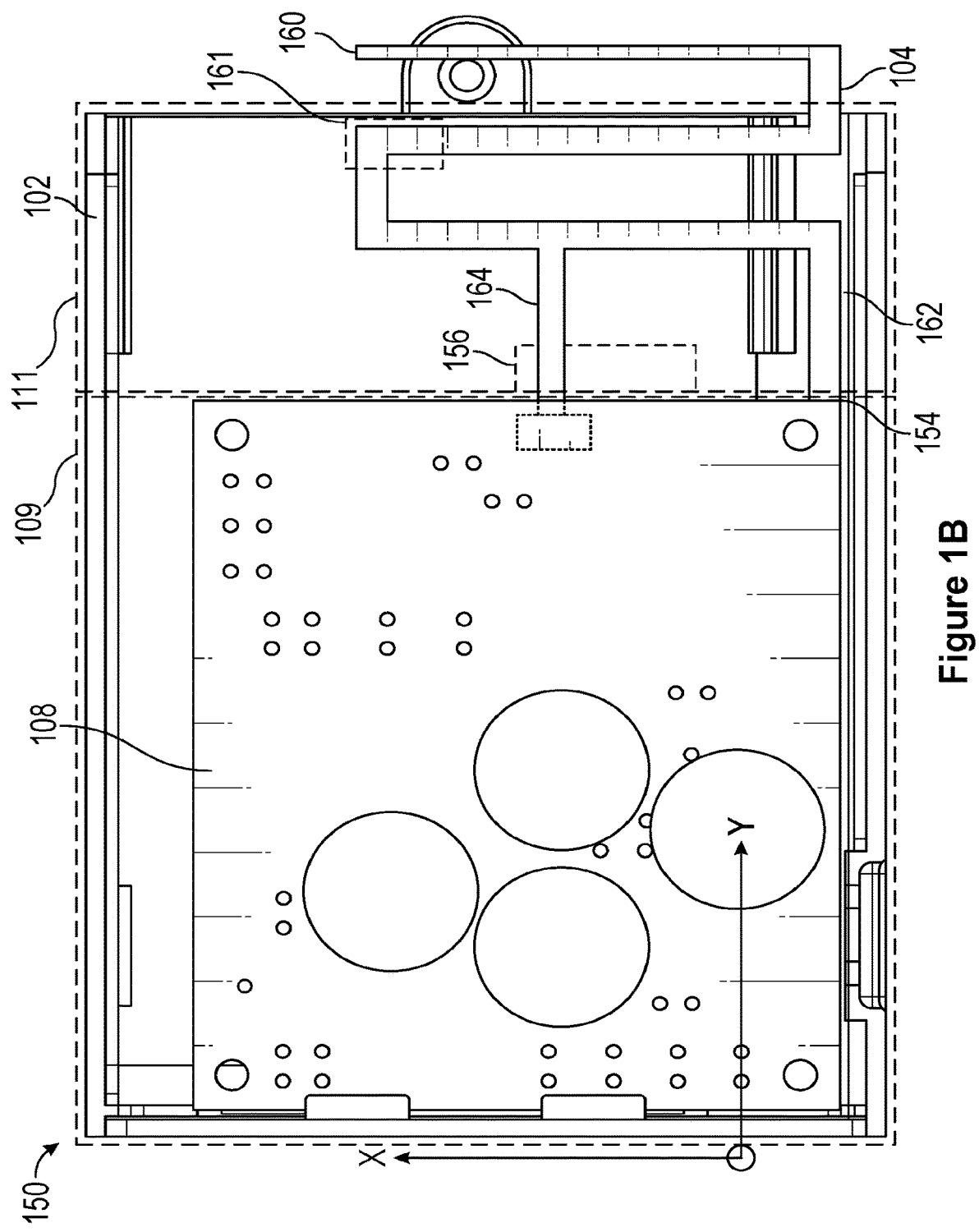
Figure 10:
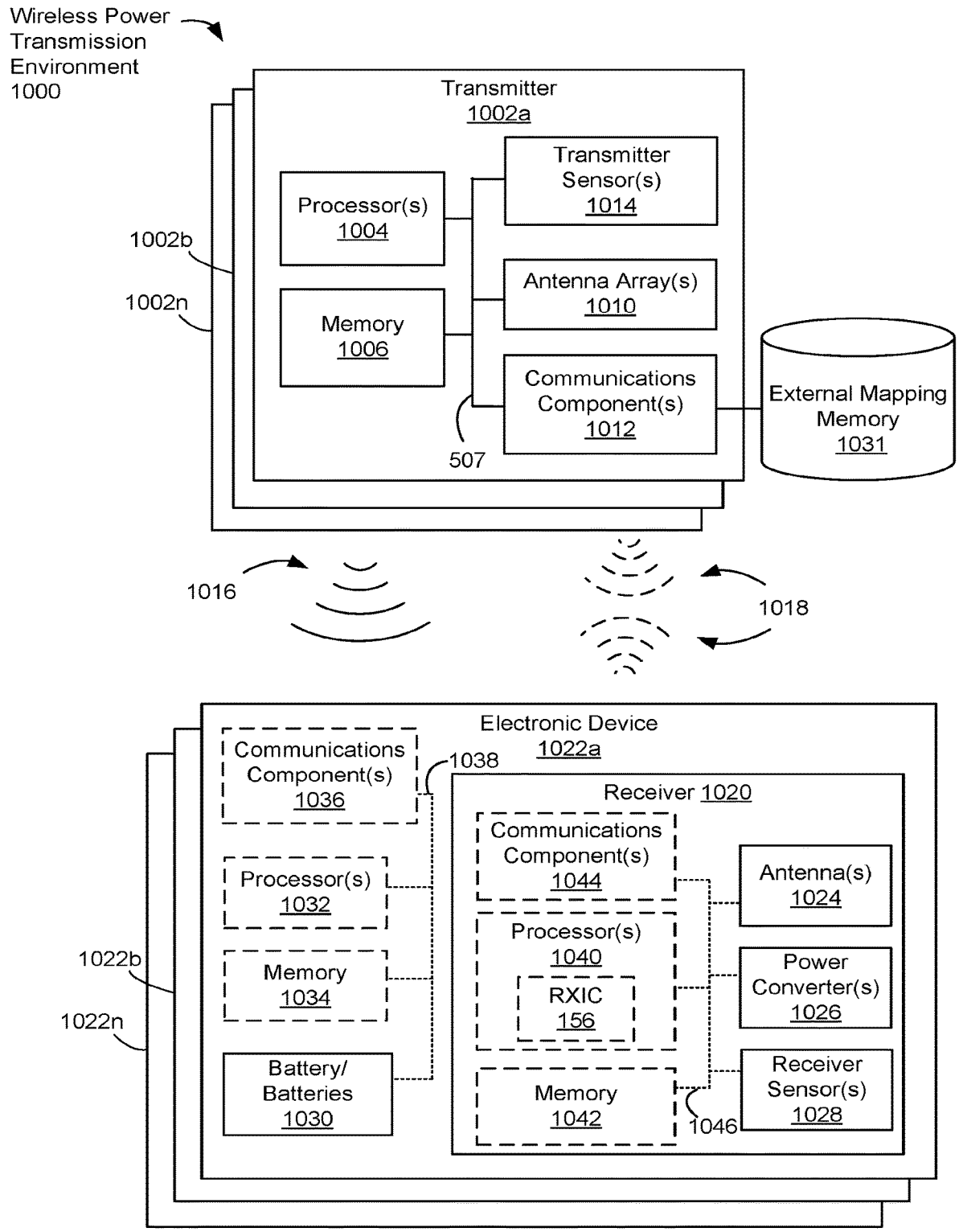
FIG. 10 is a block diagram of components of a wireless power transmission environment, in accordance with some embodiments.

FIGS. 1A and 1B illustrate different views of a wireless-power receiver (also referred to as a RF harvesting receiver) integrated in a small form-factor electronic device, in accordance with some embodiments. FIG. 1A shows a front view 100 of an electronic device 102 including a wireless-power receiver (e.g., wireless-power receiver 1020; FIG. 10). In some embodiments, the wireless-power receiver is integrated in the electronic device 102. The wireless-power receiver includes a harvester antenna 104 (e.g., a stamped metal harvester antenna, and/or an antennas 1024 described in reference to FIG. 10 below) coupled to a printed circuit board (PCB 108) of the electronic device 102. The electronic device 102 includes a display 106 powered by a power supply (e.g., a battery 1030; FIG. 10) of the electronic device 102. For example, FIG. 1 illustrates display 106 of each respective electronic device showing different information (e.g., temperature values for a shelf, quantity values of items for a shelf, and prices of items on a shelf, etc.). The wireless-power receiver is configured to receive wireless power transmitted by a wireless-power transmitter (e.g., transmitter 1002 of FIG. 10) such that electromagnetic energy is wirelessly transferred from the wireless-power transmitter to the wireless-power receiver, as described below. FIG. 1B shows a bottom view 150 of an electronic device 102 including a wireless-power receiver (e.g., wireless-power receiver 1020; FIG. 10). The bottom view 150 of the electronic device 102 shows the harvester antenna 104 coupled to the PCB 108 of the electronic device 102 and a receiver integrated circuit 156.

In some embodiments, the harvester antenna 104 is a stamped metal antenna that has a meandering shape. The meandering shape includes a predetermined number of turns or curves. In some embodiments, the predetermined number of turns is at least two. The harvester antenna 104 is quasi omnidirectional and configured to receive wireless power with any polarization. In some embodiments, a position of the harvester antenna 104 within the electronic device 102 is based, in part, on a size and/or a shape of a housing enclosing the wireless-power receiver (e.g., housing of electronic device 102). In some embodiments, the harvester antenna 104 has a thickness of 60 mils~ 1.5 mm (+/−0.5 mm) and a width of 25 mm (+/−15 mm), which is indicated by reference numerals 103 and 105, respectively, in FIG. 3A. In some embodiments, the length of the harvester antenna 104 is based, in part, on the size of the electronic device 102, the position of the harvester antenna 104 within the electronic device 102, the number of turns included in the harvester antenna 104, and the shape of the electronic device 102.

In some embodiments, a first end 160 of the harvester antenna 104 (e.g., the meandering shaped antenna) is a free end configured to receive one or more radio frequency (RF) power waves. In some embodiments, the harvester antenna 104 is configured to receive the RF power waves at a frequency of 918 MHz. In some embodiments, the receiving antenna 104 has a gain of at least 2 dB (shown and described below in reference to FIG. 4). In some embodiments, the harvester antenna 104 is configured to harvest RF energy transmitted in the environment from background sources other than a dedicated transmitter.

In some embodiments, an intermediate portion 164 of the receiving antenna 104 is coupled to a receiver integrated circuit 156 (e.g., receiver integrated circuit 156). As discussed below, the receiver integrated circuit 156 is configured to convert one or more RF power waves received by the first end of the meandering shape into usable energy for charging a battery of the electronic device 102 or for powering the electronic device 102. In some embodiments, the receiver integrated circuit 156 is an integral part of the PCB 108. Alternatively, in some embodiments, the receiver integrated circuit 156 is on a substrate distinct from the PCB 108.

In some embodiments, a second end 162 of the harvester antenna 104 is coupled to the PCB 108 of the electronic device 102—more specifically, an edge 154 of the PCB 108. In this way, the PCB 108 is configured to operate as a reference ground plane of the harvester antenna 104. The second end 162 of the harvester antenna 104 can be coupled to any edge portion of the PCB 108. In some embodiments, the edge portion of the PCB 108 at which the harvester antenna 104 is coupled is based, in part, on a size and/or a shape of a housing enclosing the wireless-power receiver (e.g., housing of electronic device 102) such that the first end 160 of the harvester antenna 104 is able to receive wireless power.

In some embodiments, the electronic device 102 is a digital price tag including a display 106. The electronic device 102 can be any small form factor device. For example, the electronic device 102 can be a digital price tag, a digital timer, a digital thermometer, a digital scale, an aspect of a smart shopping cart, a tablet, a controller, or other components used to manage inventory and pricing in supermarket or warehouse contexts, etc. In some embodiments, the electronic device 102 includes a communications component (e.g., communications component 1036 and/or 1044; FIG. 10) configured to communicatively couple to one or more electronic devices and/or wireless-power transmitters. For example, the electronic device 102 can be located within a supermarket and communicatively couple with a plurality of wireless-power transmitters 502 positioned within the supermarket and/or a computer network within the supermarket. In some embodiments, the electronic device 102 transmits and/or receives data to the one or more communicatively coupled electronic devices and/or wireless-power transmitters 502. The data can include charging information such as battery life, amount of power received, charge requests, etc. In some embodiments, the data can include electronic device 102 specific data. For example, a digital price tag can transmit data regarding the number of objects on a shelf, object price, total stock of an object, discount or sales related to the object, etc. Similarly, the digital price tag can receive data updating a price or other information of an object.

In some embodiments, the electronic device 102 can be located within a supermarket and communicatively couple with a plurality of wireless-power transmitters 502 positioned within a warehouse for actively updating inventory levels. A plurality of electronic devices 102 and a plurality of wireless-power transmitters 502 may be positioned around the warehouse. Additionally, the plurality of electronic devices 102 and a plurality of wireless-power transmitters 502 in the warehouse can be configured to communicate with a network to update the displays of the electronic devices to reflect inventory levels. In some embodiments, the electronic devices 102 are in communication with the network. In some embodiments, plurality of electronic devices 102 communicate with the plurality of wireless-power transmitters 502, and the plurality of wireless-power transmitters 502 communicate with the network.

The harvester antenna 104 is interchangeable. More specifically, the harvester antenna 104 is configured such that it can be positioned and/or repositioned along any edge of the PCB 108 of an electronic device 102. The harvester antenna 104 can be designed to accommodate different configurations of the electronic device 102. For example, the receiving antenna 104 can be coupled to different electronic devices including different PCB layouts, distinct components, and/or distinct housings. The harvester antenna 104 can be retrofitted into existing electronic devices 102 and or incorporated into an electronic device 102 during manufacturing. The harvester antenna 104 is inexpensive and easy to manufacture, which increases the number of electronic devices 102 in which the harvester antenna 104 can be integrated. This increases the availability of wireless power to an electronic device 102.

Figure 2:
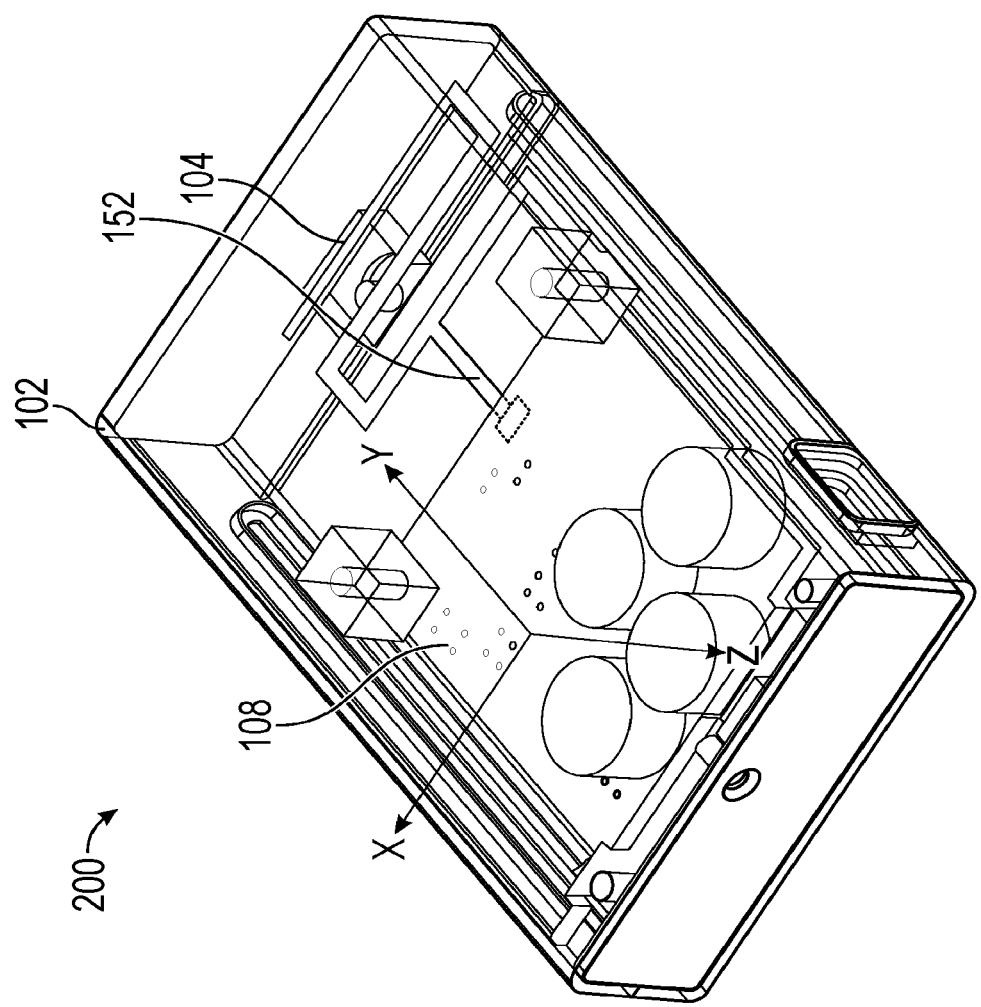
FIG. 2 illustrates an integrated wireless-power harvester enclosed by a housing of a small form-factor electronic device, in accordance with some embodiments.

FIG. 2 illustrates an integrated wireless-power receiver enclosed by an electronic device, in accordance with some embodiments.

Figure 3B:
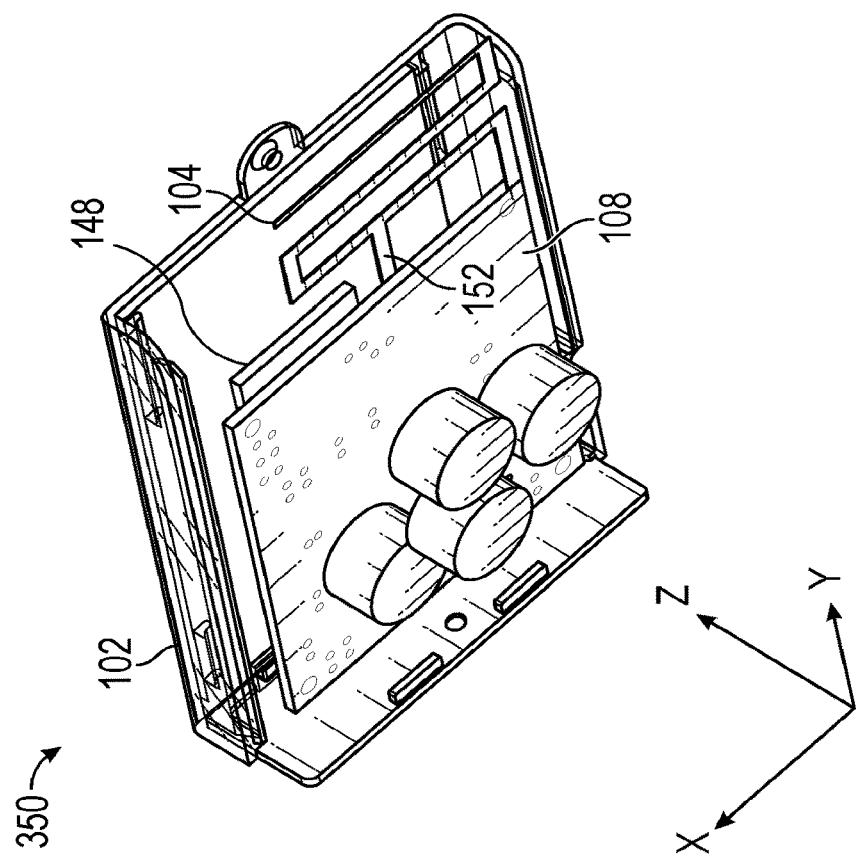
FIGS. 3A and 3B illustrate different bottom views of an integrated wireless-power harvester, in accordance with some embodiments.
Figure 3A:
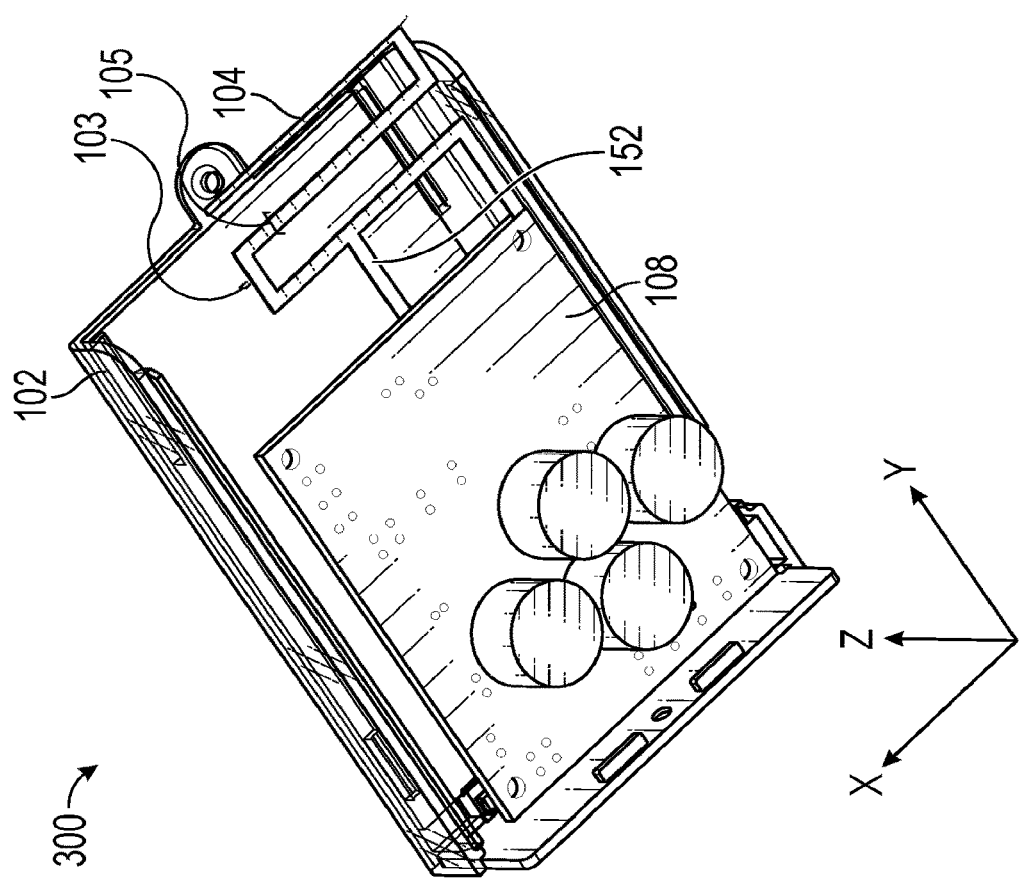

FIGS. 3A and 3B illustrate different perspective views of the integrated wireless-power receiver discussed in FIGS. 1A-1B and 2, in accordance with some embodiments. This figures show that the integrated wireless-power receiver fits within the housing of the small form-factor device, such that no changes to dimensions of the small form-factor device need be made to account the integrate wireless-power receiver. FIG. 3A illustrates an optional battery 148 (e.g., battery 1030 shown in FIG. 10) placed within the housing of the small form-factor device.

Figure 4:
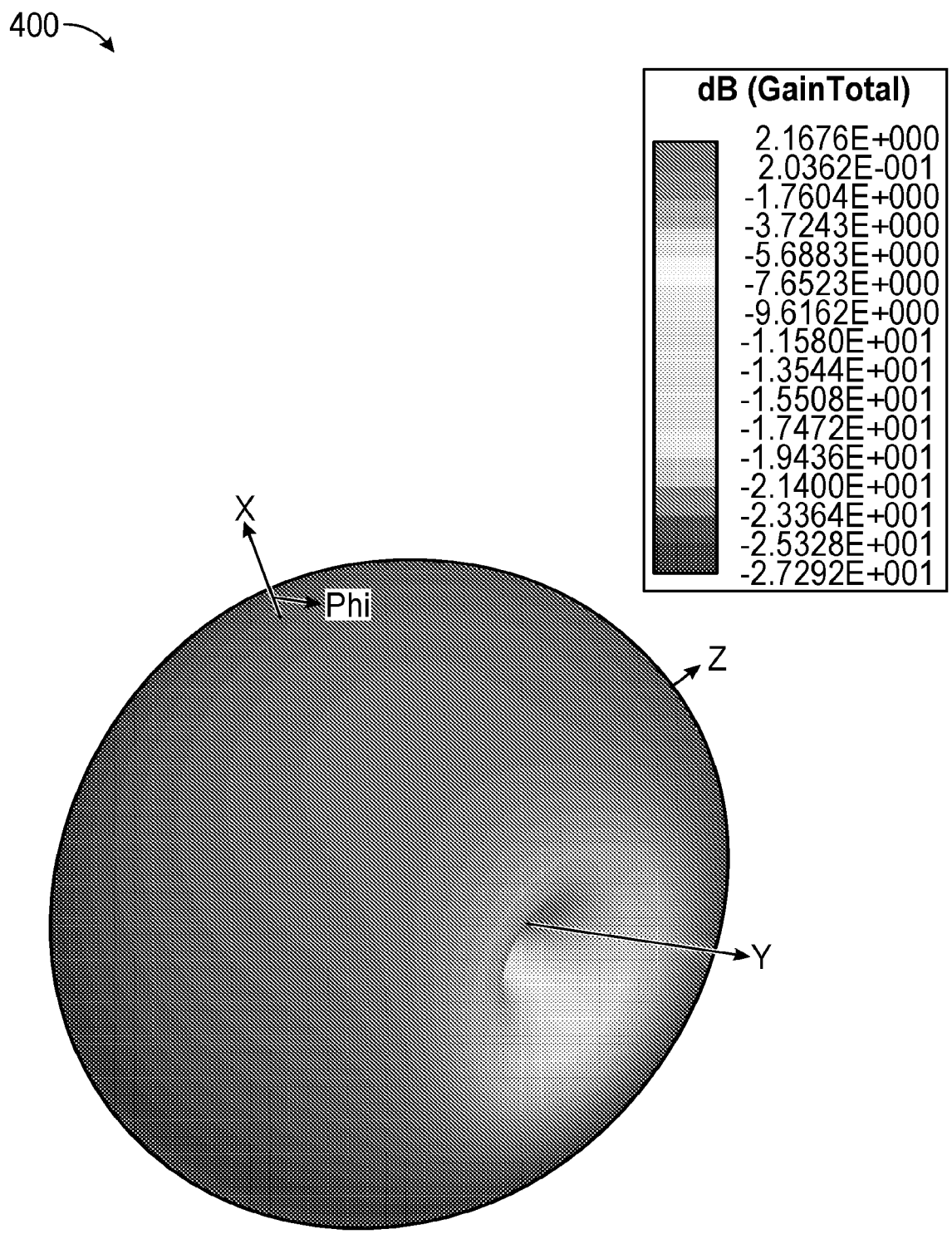
FIG. 4 illustrates a radiation pattern produced by an embodiment of the wireless-power harvester shown in FIGS. 1A and 1B, in accordance with some embodiments.

FIG. 4 illustrates a radiation pattern produced by an embodiment of a wireless-power receiver shown in FIGS. 1A and 1B. As shown, the radiation pattern 400 is substantially omnidirectional. More specifically, the wireless-power receiver has a 2 dB gain in the X, Y, and Z directions. In some embodiments, the wireless-power receiver is able to achieve an efficiency of approximately 94%.

Figure 5:
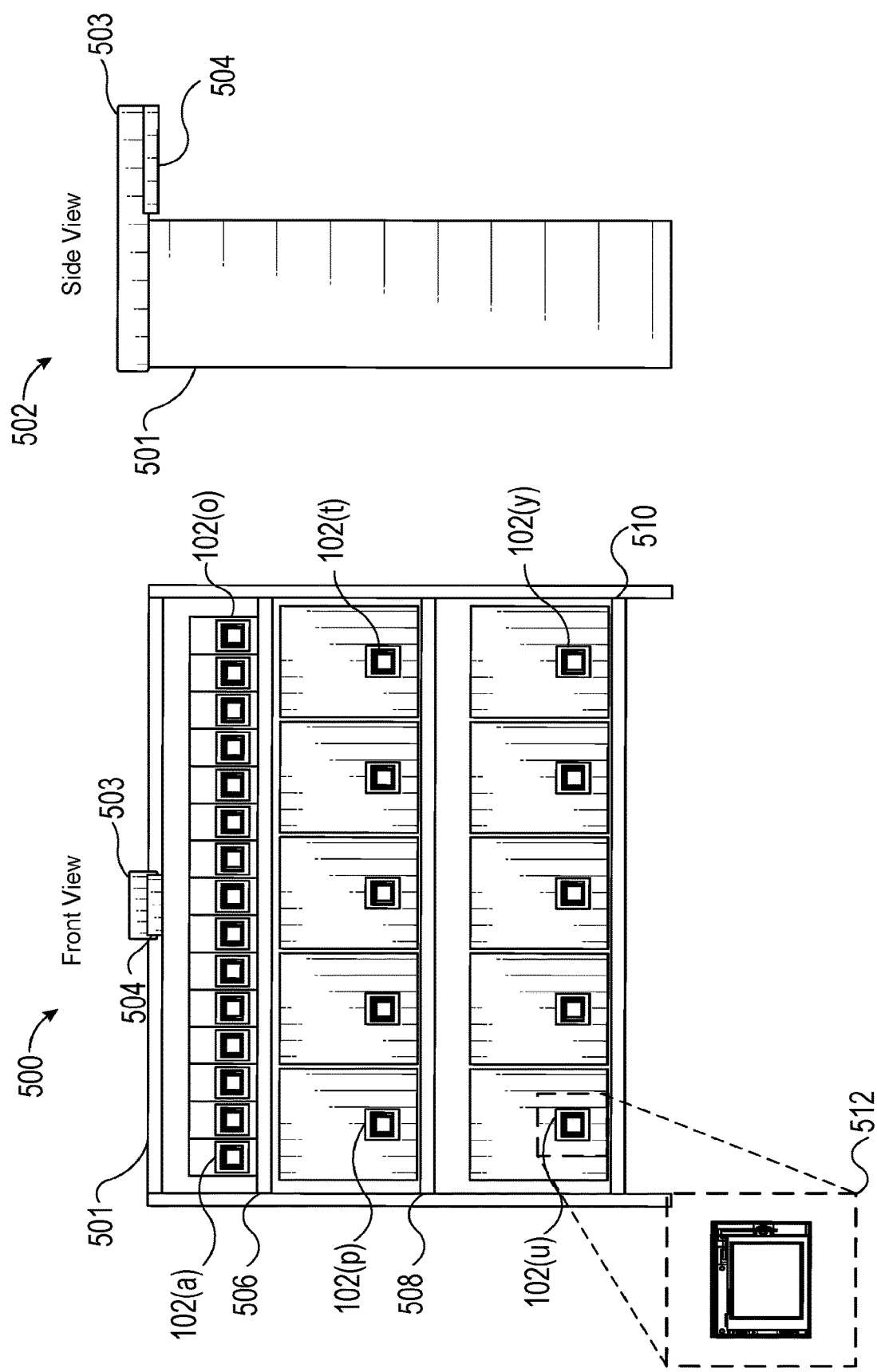
FIG. 5 illustrates a shelving-mounted wireless power transmitting system for powering and/or charging one or more wireless-power harvesters integrated into small form-factor electronic devices, in accordance with some embodiments.

FIG. 5 illustrates a shelving-mounted wireless-power transmitting system for powering and/or charging one or more wireless-power receiver integrated into an electronic device (e.g., electronic device 102 in FIGS. 1A and 1B), in accordance with some embodiments. In particular, FIG. 5 shows a front view 500 of a shelving system 501 (e.g., shelving rack) and a side view 502 of a shelving system 501. Front view 500 of a shelving system 501 illustrates a shelving-mounted wireless-power transmitter system 504 placed at the top of the shelving system 501 (e.g., shelving-mounted wireless-power transmitter system 504 is placed above the one or more wireless-power receivers) that is configured to project radio frequency (RF) power waves to the one or more wireless-power receivers placed on the different shelves of the shelving system. In some embodiments, the transmitter system is mounted to the shelving system (e.g., shelving unit) via a mounting structure (e.g., mounting structure 503). The front view 500 of the shelving system 501 also shows a plurality of electronic device(s) 102 placed on each shelf of the shelving system. The upper-most shelf 506 has a first plurality of electronic device(s) (e.g., 102(a) through 102(o)) placed on the upper-most shelf. In some embodiments, the first plurality of electronic device(s) are attached to items that are place on the upper most shelf. In some embodiments, the first plurality of electronic device(s) are placed directly (e.g., placed on an outward edge of the upper-most shelf) on the shelves at locations corresponding to items resting on the shelf. Front view 500 of the shelving system 501 also illustrates a middle shelf 508 that includes a second plurality of electronic device(s) 102 (e.g., 102(p) through 102(t)) placed on it, and a bottom shelf 510 that includes a third plurality of electronic device(s) 102 (e.g., 102(u) through 102(y)). Front view 500 of the shelving system 501 also shows an expanded electronic device 512, which corresponds to the electronic devices discussed in reference to FIG. 1A through FIG. 4. FIG. 5 also illustrates a side view 502 of a shelving system 501 that shows the placement of the shelving-mounted wireless-power transmitter system 504 relative to the shelving system 501.

Figure 6:
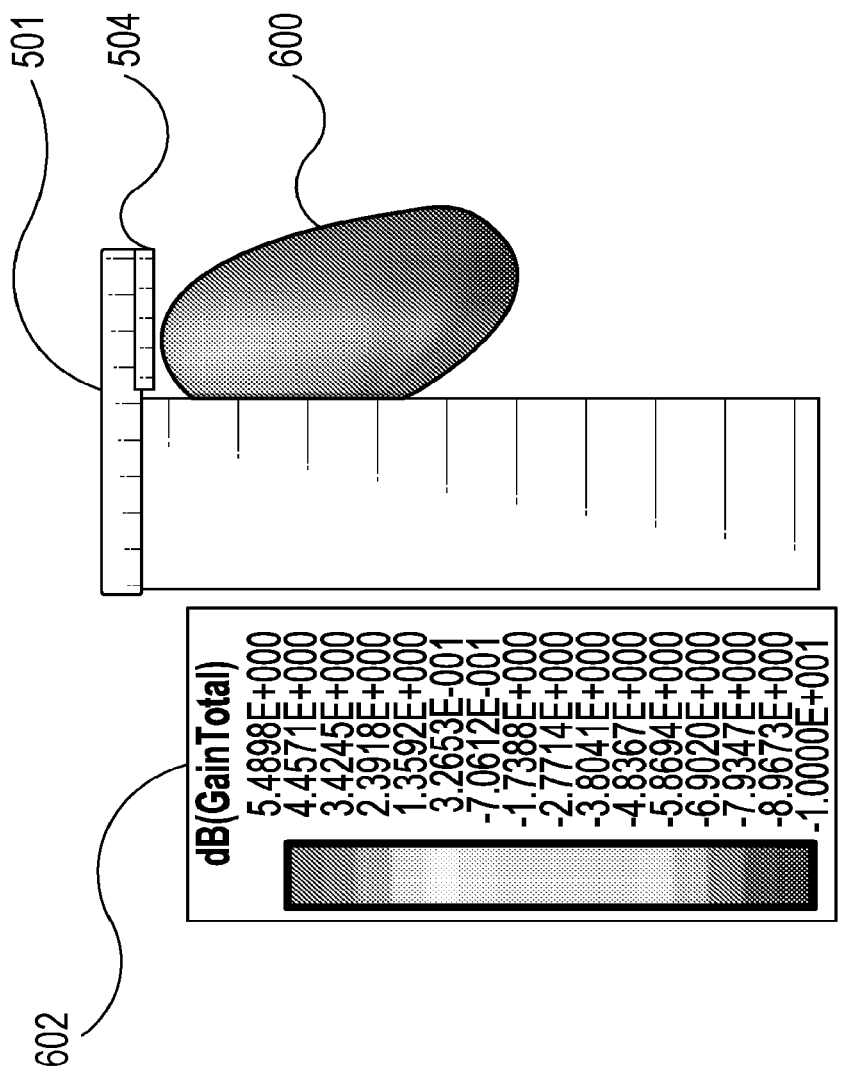
FIG. 6 illustrates an example cross-section of a gain distribution (emitted radio frequency waves) from a transmitter system placed at the top of a shelving system, in accordance with some embodiments.

FIG. 6 illustrates an example cross-section 600 of the gain distribution (emitted radio frequency waves) from shelving-mounted wireless-power transmitter system 504 placed at the top of the shelving system 501, in accordance with some embodiments. FIG. 6 also illustrates a table 602 for interpreting the gradation of the cross-section 600 of the gain.

Figure 7:
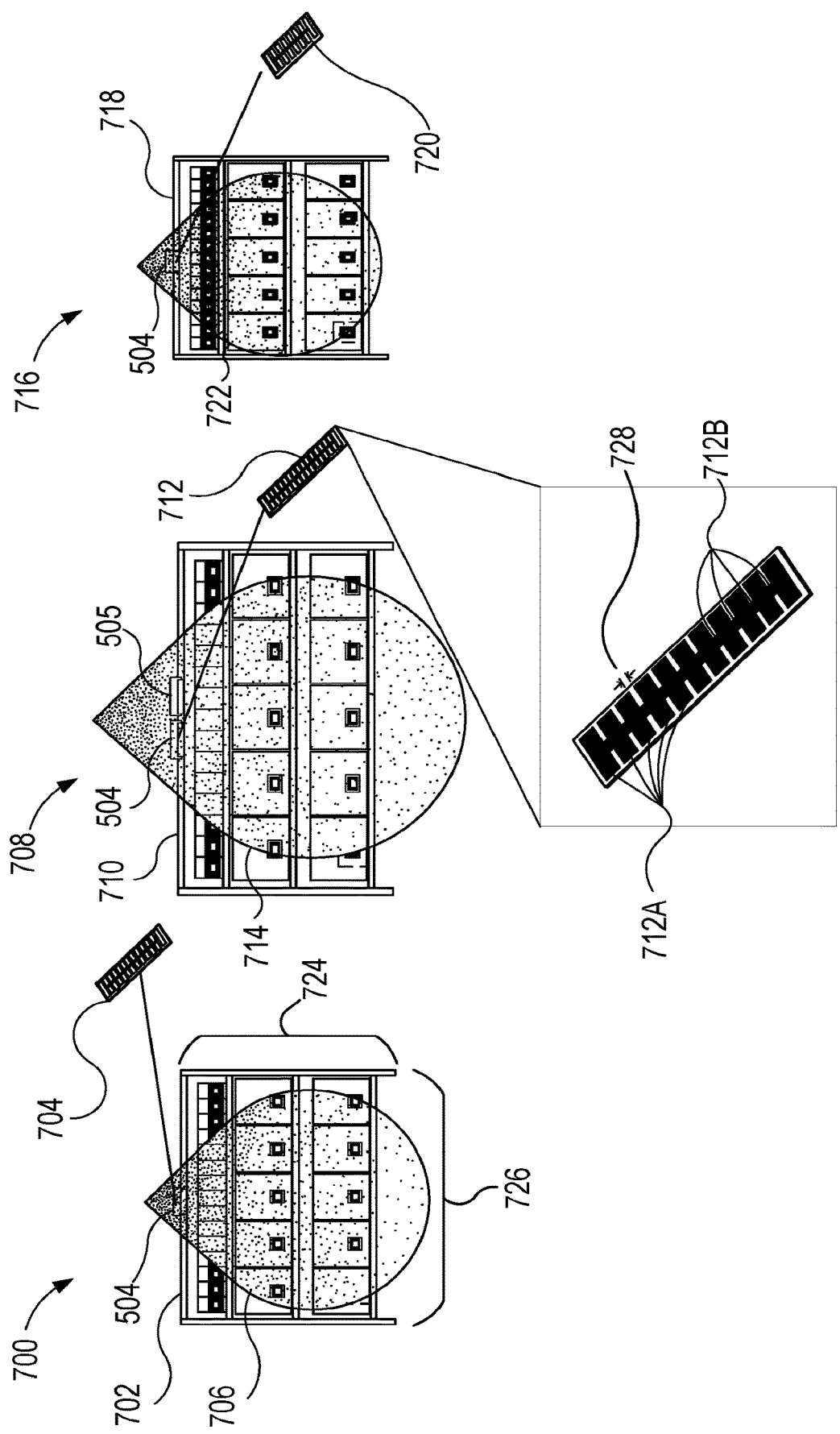
FIG. 7 illustrates three example variations of the shelving-mounted wireless power transmitting system for powering and/or charging one or more wireless-power harvesters integrated into small form-factor electronic devices shown in FIGS. 5-6, in accordance with some embodiments.

FIG. 7 illustrates three example variations of the shelving-mounted wireless power transmitting system for powering and/or charging one or more wireless-power receiver integrated into an electronic device shown in FIGS. 5-6, in accordance with some embodiments. FIG. 7 illustrates that the shelving-mounted wireless-power transmitter system 504 can be adjusted to account for varying sizes of shelving systems. In some embodiments, this adjustment is at least partially done by altering the number of conductive segments to apply coverage for varying shelving systems having different widths, depths, heights. In some embodiments, the number of conductive segments are increased (e.g., more conductive segments are added in series) in order to increase the coverage area (e.g., horizontal coverage area) of the shelving-mounted wireless-power transmitter system 504.

FIG. 7 shows a first example shelving-mounted wireless power transmitting system 700 that is configured to radiate radiofrequency (RF) wireless power waves towards the shelving unit of a first size 702 with a predetermined height 724 and a predetermined width 726. In order to radiate RF wireless power waves to all the receivers on the shelving unit of a first size 702, a first number of conductive segments 704 are included in the shelving-mounted wireless-power transmitter system 504. As a result of the first number of conductive segments being included in the shelving-mounted wireless-power transmitter system 504, a first RF coverage area 706 is produced.

FIG. 7 also shows a second example shelving-mounted wireless power transmitting system 708 that is configured to radiate RF wireless power waves towards the shelving unit of a second size 710 (e.g., larger than the shelving unit of the first size 702). In order to radiate RF wireless power waves to all the receivers on the shelving unit of a second size 710, a second number of conductive segments 712 are included in the shelving-mounted wireless-power transmitter system 504 (e.g., greater in number than the first number of conductive segments 704). In some embodiments, two different pluralities of conductive segments are included, illustrated as a first plurality of conductive segments 712A and a second plurality of conductive segments 712B separating adjacent respective segments of the first plurality from one another by a predetermined gap distance 728. In some embodiments, an additional shelving-mounted wireless-power transmitter system 505 can be mounted to the shelving unit. As a result of the second number of conductive segments being included in the shelving-mounted wireless-power transmitter system 504, a second RF coverage area 714 is produced (e.g., covering more area than the first RF coverage area 706).

FIG. 7 shows a third example shelving-mounted wireless power transmitting system 716 that is configured to radiate RF wireless power waves towards the shelving unit of a third size 718 (e.g., smaller than the shelving unit of the first size 702 and the shelving unit of the second size 710). In order to radiate RF wireless power waves to all the receivers on the shelving unit of a third size 718, a third number of conductive segments 720 are included in the shelving-mounted wireless-power transmitter system 504 (e.g., lesser in number than the first number of conductive segments 704 and the second number of conductive segments 712). As a result of the third number of conductive segments being included in the shelving-mounted wireless-power transmitter system 504, a third RF coverage area 722 is produced (e.g., covering less area than the first RF coverage area 706 and second RF coverage area 714).

Figure 8:
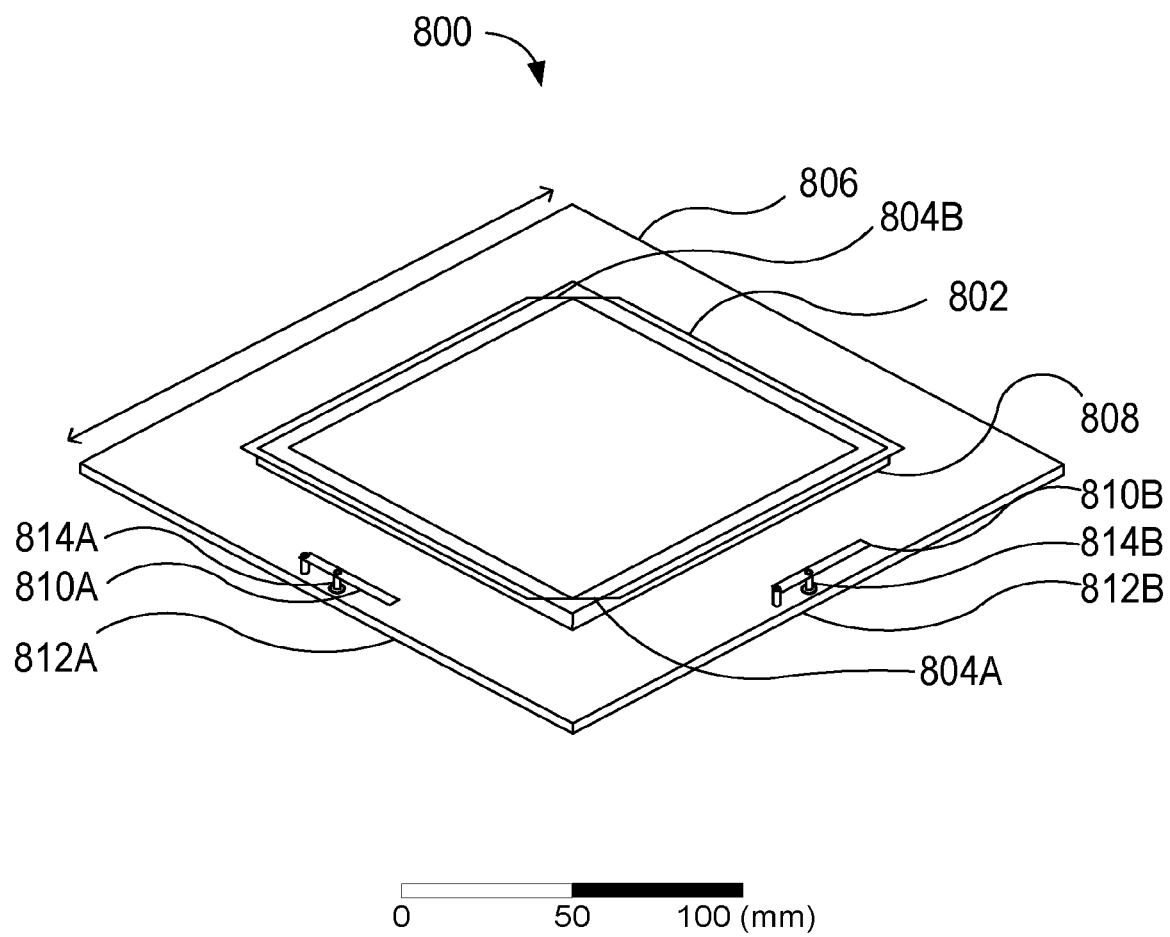
FIG. 8 illustrates a wireless transmitting device 800 that is configured to emit RF wireless power waves using a first frequency band and data-communication waves using a second frequency band, distinct from the first frequency band, in accordance with some embodiments.

FIG. 8 illustrates a wireless transmitting device 800 that is configured to emit RF wireless power waves using a first frequency band and communication waves using a second frequency band, distinct from the first frequency band, in accordance with some embodiments. FIG. 8 illustrates a RF wireless-power antenna 802 that is configured to radiate wireless power waves using a first frequency band. In some embodiments, the RF wireless-power antenna 802 is configured to emit power waves in a circular polarized manner. In some embodiments, the RF wireless-power antenna 802 is notched on opposing corners (e.g., a first notch 804A and a second notch 804B) of the wireless-power antenna 802. The opposing notches help aid in the circular polarization of the RF waves emitted by the RF wireless-power antenna 802. In some embodiments, the RF wireless-power antenna 802 is coupled to a backplane 806. In some embodiments, the RF wireless-power antenna 802 is coupled to a spacer element 808 that is coupled to the backplane 806.

FIG. 8 also illustrates that the wireless transmitting device 800 includes two data communication antennas (e.g., a first data communication antenna 810A and a second data communication antenna 810B) that are configured to emit communication waves using a second frequency band. The first data communication antenna 810A and the second data communication antenna 810B are placed perpendicular to one another on adjacent sides of the backplane 806. In some embodiments, the first data communication antenna 810A is placed in the middle of the first edge 812A and the second data communication antenna 810B is placed in the middle of the second edge 812B. In some embodiments, the first data communication antenna 810A and the second data communication antenna 810B are placed around the periphery of the RF wireless-power antenna 802. In some embodiments, the first data communication antenna 810A is suspended by at least one post (e.g., post 814A) and the second data communication antenna 810B is suspended by a at least one post (e.g., post 814B). In some embodiments, at least one post acts as a connection to the ground plane.

Figure 9:
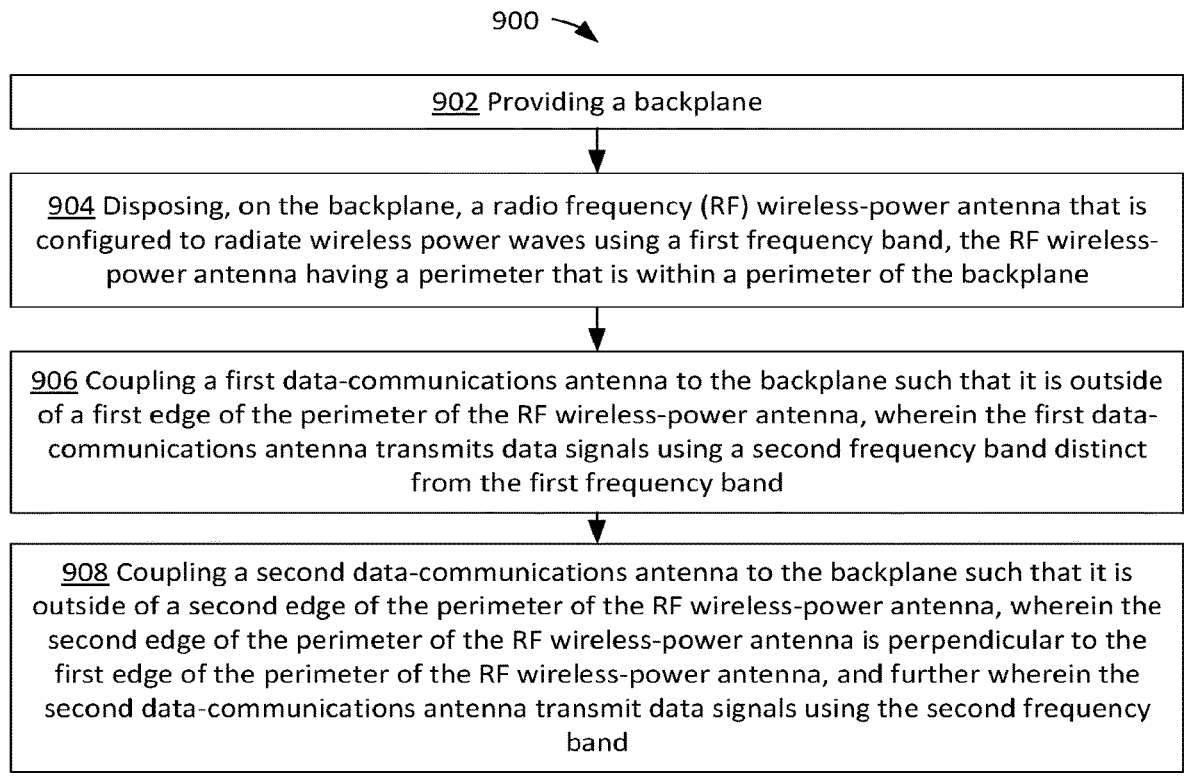
FIG. 9 is a flow diagram showing a method of manufacturing a wireless-power device, in accordance with some embodiments.

FIG. 9 is a flow diagram showing a method of manufacturing a wireless-power device, in accordance with some embodiments. Operations (e.g., steps) of the method 900 may be performed by a manufacturer and/or a manufacturing system. In some embodiments, manufacturing a wireless-power device comprises providing (902) a backplane (e.g., a substrate with no computing components). For example, a substrate with no computing components, as shown as backplane 806 in FIG. 8.

Manufacturing a wireless-power device comprises disposing (904), on the backplane, a radio frequency (RF) wireless-power antenna that is configured to radiate wireless power waves using a first frequency band, the RF wireless-power antenna having a perimeter that is within a perimeter of the backplane (e.g., FIG. 8 illustrates that the RF wireless-power antenna 802 having a perimeter within a perimeter of the backplane 806).

Manufacturing a wireless-power device comprises coupling (906) a first data-communications antenna (e.g., a Bluetooth Low Energy (BLE) radio) to the backplane such that it is outside of a first edge of the perimeter of the RF wireless-power antenna. The first data-communications antenna transmits data signals using a second frequency band distinct from the first frequency band (e.g., FIG. 8 illustrates first data communication antenna 810A coupled to the backplane 806).

Manufacturing a wireless-power device comprises coupling (908) a second data-communications antenna (e.g., a Bluetooth Low Energy (BLE) radio) to the backplane such that it is outside of a second edge of the perimeter of the RF wireless-power antenna. The second edge of the perimeter of the RF wireless-power antenna is perpendicular to the first edge of the perimeter of the RF wireless-power antenna. The second data-communications antenna transmit data signals using the second frequency band (e.g., FIG. 8 illustrates second data communication antenna 810B coupled to the backplane 806 perpendicular to the first data communication antenna 810A).

FIG. 10 is a block diagram of components of wireless power transmission environment 1000, in accordance with some embodiments. Wireless power transmission environment 1000 includes, for example, transmitters 1002 (e.g., transmitters 1002a, 1002b . . . 1002n) (also referred to as wireless-power-transmitting device and shelving-mounted wireless-power-transmitting device) and one or more receivers 1020 (e.g., receivers 1020a, 1020b . . . 1020n) (also referred to as wireless-power receiver and RF harvesting receiver). In some embodiments, each respective wireless power transmission environment 1000 includes a number of receivers 1020, each of which is associated with a respective electronic device 1022. In some instances, the transmitter 1002 is referred to herein as a "wireless-power-transmitting device" or a "wireless power transmitter." Additionally, in some instances, the receiver 1020 is referred to herein as a "wireless-power-receiving device" or a "wireless-power receiver."

An example transmitter 1002 (e.g., transmitter 1002a) includes, for example, one or more processor(s) 1004, a memory 1006, one or more antenna arrays 1010, one or more communications components 1012 (also referred to herein as a "wireless communications radio," a "communications radio" or simply a "radio"), and/or one or more transmitter sensors 1014. In some embodiments, these components are interconnected by way of a communications bus 1007.

In some embodiments, a single processor 1004 (e.g., processor 1004 of transmitter 1002a) executes software modules for controlling multiple transmitters 1002 (e.g., transmitters 1002b . . . 1002n). In some embodiments, a single transmitter 1002 (e.g., transmitter 1002a) includes multiple processors 1004, such as one or more transmitter processors (configured to, e.g., control transmission of signals 1016 by antenna array 1010), one or more communications component processors (configured to, e.g., control communications transmitted by communications component 1012 and/or receive communications by way of communications component 1012) and/or one or more sensor processors (configured to, e.g., control operation of transmitter sensor 1014 and/or receive output from transmitter sensor 1014).

The wireless-power receiver 1020 receives power transmission signals 1016 and/or data-communication signals 1018 transmitted by transmitters 1002. In some embodiments, the receiver 1020 includes one or more antennas 1024 (e.g., an antenna array including multiple antenna elements), power converter 1026, receiver sensor 1028, and/or other components or circuitry (e.g., processor(s) 1040, memory 1042, and/or communication component(s) 1044). In some embodiments, these components are interconnected by way of a communications bus 1046. References to these components of receiver 1020 cover embodiments in which one or more of these components (and combinations thereof) are included.

The receiver 1020 converts energy from received signals 1016 (also referred to herein as RF power transmission signals, or simply, RF signals, RF waves, power waves, or power transmission signals) into electrical energy to power and/or charge electronic device 1022. For example, the receiver 1020 uses the power converter 1026 to convert energy derived from power waves 1016 to alternating current (AC) electricity or direct current (DC) electricity to power and/or charge the electronic device 1022. Non-limiting examples of the power converter 1026 include rectifiers, rectifying circuits, voltage conditioners, among suitable circuitry and devices.

In some embodiments, the receiver 1020 is a standalone device that is detachably coupled to one or more electronic devices 1022. For example, the electronic device 1022 has processor(s) 1032 for controlling one or more functions of the electronic device 1022, and the receiver 1020 has processor(s) 1040 for controlling one or more functions of the receiver 1020.

In some embodiments, the receiver 1020 is a component of the electronic device 1022. For example, processors 1032 control functions of the electronic device 1022 and the receiver 1020. In addition, in some embodiments, the receiver 1020 includes one or more processors 1040, which communicates with processors 1032 of the electronic device 1022.

In some embodiments, the electronic device 1022 includes one or more processors 1032, memory 1034, one or more communication components 1036, and/or one or more batteries 1030. In some embodiments, these components are interconnected by way of a communications bus 1038. In some embodiments, communications between electronic device 1022 and receiver 1020 occur via communications component(s) 1036 and/or 1044. In some embodiments, communications between the electronic device 1022 and the receiver 1020 occur via a wired connection between communications bus 1038 and communications bus 1046. In some embodiments, the electronic device 1022 and the receiver 1020 share a single communications bus.

In some embodiments, the receiver 1020 receives one or more power waves 1016 directly from the transmitter 1002 (e.g., via one or more antennas 1024). In some embodiments, the receiver 1020 harvests power waves from one or more pockets of energy created by one or more power waves 1016 transmitted by the transmitter 1002. In some embodiments, the transmitter 1002 is a near-field transmitter that transmits the one or more power waves 1016 within a near-field distance (e.g., less than approximately six inches away from the transmitter 1002). In other embodiments, the transmitter 1002 is a far-field transmitter that transmits the one or more power waves 1016 within a far-field distance (e.g., more than approximately six inches away from the transmitter 1002).

After the power waves 1016 are received and/or energy is harvested from them, circuitry (e.g., integrated circuits, amplifiers, rectifiers, and/or voltage conditioner) of the receiver 1020 converts the energy of the power waves to usable power (i.e., electricity), which powers the electronic device 1022 and/or is stored to battery 1030 of the electronic device 1022. In some embodiments, a rectifying circuit of the receiver 1020 translates the electrical energy from AC to DC for use by the electronic device 1022. In some embodiments, a voltage conditioning circuit increases or decreases the voltage of the electrical energy as required by the electronic device 1022. In some embodiments, an electrical relay conveys electrical energy from the receiver 1020 to the electronic device 1022.

In some embodiments, the electronic device 1022 obtains power from multiple transmitters 1002 and/or using multiple receivers 1020. In some embodiments, the wireless power transmission environment 1000 includes a plurality of electronic devices 1022, each having at least one respective receiver 1020 that is used to harvest power waves from the transmitters 1002 into power for charging the electronic devices 1022.

In some embodiments, the one or more transmitters 1002 adjust values of one or more characteristics (e.g., waveform characteristics, such as phase, gain, direction, amplitude, polarization, and/or frequency) of power waves 1016. For example, a transmitter 1002 selects a subset of one or more antenna elements of antenna array 1010 to initiate transmission of power waves 1016, cease transmission of power waves 1016, and/or adjust values of one or more characteristics used to transmit power waves 1016. In some embodiments, the one or more transmitters 1002 adjust power waves 1016 such that trajectories of power waves 1016 converge at a predetermined location within a transmission field (e.g., a location or region in space), resulting in controlled constructive or destructive interference patterns. The transmitter 1002 may adjust values of one or more characteristics for transmitting the power waves 1016 to account for changes at the wireless-power receiver that may negatively impact transmission of the power waves 1016.

Note that, in some embodiments, the transmitter 1002 utilizes beamforming techniques to wirelessly transfer power to a receiver 1020, while in other embodiments, the transmitter 1002 does not utilize beamforming techniques to wirelessly transfer power to a receiver 1020 (e.g., in circumstances in which no beamforming techniques are used, the transmitter controller IC 1060 discussed below might be designed without any circuitry to allow for use of beamforming techniques, or that circuitry may be present, but might be deactivated to eliminate any beamforming control capability).

In some conventional systems, a viable RF power level can be provided to an optional beam-forming integrated circuit (IC) (not shown), which then provides phase-shifted signals to one or more power amplifiers. In such conventional systems, the optional beam-forming IC is used to ensure that power transmission signals sent using two or more antennas wireless-power receivers are transmitted with appropriate characteristics (e.g., phases) to ensure that power transmitted to the particular wireless-power receiver is maximized (e.g., the power transmission signals arrive in phase at the particular wireless-power receiver). The embodiments herein, however, do not always require the use of a beam-forming integrated circuit. In certain embodiments, such a beam-forming integrated circuit (and/or associated algorithm) can be included in the system, but is disabled (or is not included in the system at all) and is not used in conjunction with wirelessly-transmitted energy to receiver devices.

In some embodiments, the transmitter controller IC 1060 provides the viable RF power level directly to the one or more power amplifiers and does not use any beam-forming capabilities (e.g., bypasses/disables a beam-forming IC and/or any associated algorithms if phase-shifting is not required, such as when only a single antenna 1024 is used to transmit power transmission signals to a wireless-power receiver). In some embodiments, only a single antenna is utilized with a single power amplifier (e.g., each of the transmitter devices 10, 20, 22, FIG. 1) can be configured to use a single antenna and a single power amplifier and none of the transmitter devices need make use of active beam-forming control to wirelessly deliver sufficient power to the harvesters.

In some embodiments, the transmitter controller IC 1060 provides the viable RF power level directly to the one or more power amplifier units 1120 and does not use a beam-forming IC. In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase.

In some embodiments, respective antenna arrays 1010 of the one or more transmitters 1002 may include a set of one or more antennas configured to transmit the power waves 1016 into respective transmission fields of the one or more transmitters 1002. Integrated circuits of the respective transmitter 1002, such as a controller circuit (e.g., a radio frequency integrated circuit (RFIC)) and/or waveform generator, may control the behavior of the antennas. For example, based on the information received from the receiver 1020 by way of the communication signal 1018, a controller circuit (e.g., processor 1004 of the transmitter 1002, FIG. 12) may determine values of the waveform characteristics (e.g., amplitude, frequency, trajectory, direction, phase, polarization, among other characteristics) of power waves 1016 that would effectively provide power to the receiver 1020, and in turn, the electronic device 1022. The controller circuit may also identify a subset of antennas from the antenna arrays 1010 that would be effective in transmitting the power waves 1016. In some embodiments, a waveform generator circuit (not shown in FIG. 10) of the respective transmitter 1002 coupled to the processor 1004 may convert energy and generate the power waves 1016 having the specific values for the waveform characteristics identified by the processor 1004/controller circuit, and then provide the power waves to the antenna arrays 1010 for transmission.

In some embodiments, the communications component 1012 transmits data-communication signals 1018 by way of a wired and/or wireless communication connection to the receiver 1020. In some embodiments, the communications component 1012 generates data-communication signals 1018 used for triangulation of the receiver 1020 (e.g., test signals). In some embodiments, the data-communication signals 1018 are used to convey information between the transmitter 1002 and receiver 1020 for adjusting values of one or more waveform characteristics used to transmit the power waves 1016 (e.g., convey amounts of power derived from RF test signals). In some embodiments, the data-communication signals 1018 include information related to status, efficiency, user data, power consumption, billing, geo-location, and other types of information.

In some embodiments, the communications component 1012 transmits data-communication signals 1018 to the receiver 1020 by way of the electronic device 1022a. For example, the communications component 1012 may convey information to the communications component 1036 of the electronic device 1022a, which the electronic device 1022a may in turn convey to the receiver 1020 (e.g., via bus 1038).

In some embodiments, the communications component 1012 includes a communications component antenna for communicating with the receiver 1020 and/or other transmitters 1002 (e.g., transmitters 1002b through 1002n). In some embodiments, these data-communication signals 1018 are sent using a first channel (e.g., a first frequency band) that is independent and distinct from a second channel (e.g., a second frequency band distinct from the first frequency band) used for transmission of the power waves 1016.

In some embodiments, the receiver 1020 includes a receiver-side communications component 1044 configured to communicate various types of data with one or more of the transmitters 1002, through a respective communication signal 1018 generated by the receiver-side communications component (in some embodiments, a respective communication signal 1018 is referred to as an advertising signal). The data may include location indicators for the receiver 1020 and/or electronic device 1022, a power status of the device 1022, status information for the receiver 1020, status information for the electronic device 1022, status information about the power waves 1016, and/or status information for pockets of energy. In other words, the receiver 1020 may provide data to the transmitter 1002, by way of the communication signal 1018, regarding the current operation of the system 1000, including: information identifying a present location of the receiver 1020 or the device 1022, an amount of energy (i.e., usable power) received by the receiver 1020, and an amount of power received and/or used by the electronic device 1022, among other possible data points containing other types of information.

In some embodiments, the data contained within data-communication signals 1018 is used by the electronic device 1022, the receiver 1020, and/or the transmitters 1002 for determining adjustments to values of one or more waveform characteristics used by the antenna array 1010 to transmit the power waves 1016. Using a communication signal 1018, the transmitter 1002 communicates data that is used, e.g., to identify receivers 1020 within a transmission field, identify electronic devices 1022, determine safe and effective waveform characteristics for power waves, and/or hone the placement of pockets of energy. In some embodiments, the receiver 1020 uses a communication signal 1018 to communicate data for, e.g., alerting transmitters 1002 that the receiver 1020 has entered or is about to enter a transmission field (e.g., come within wireless-power-transmission range of a transmitter 1002), provide information about the electronic device 1022, provide user information that corresponds to the electronic device 1022, indicate the effectiveness of received power waves 1016, and/or provide updated characteristics or transmission parameters that the one or more transmitters 1002 use to adjust transmission of the power waves 1016.

In some embodiments, the receiver 1020 does not include a distinct communications component 1044. Rather, the receiver 1020 is configured to reflect RF signals transmitted by the transmitter 1002 at the one or more antennas 1024 and, importantly, modulate the reflected RF signals to convey data (or a message) to transmitter 1002. In such embodiments, the transmitter 1002 may also lack a distinct communications component. Instead, the transmitter 1002 may receive the reflected RF signals at the one or more antenna arrays 1010, and the transmitter 1002 may demodulate the reflected RF signals in order to interpret them.

In some embodiments, transmitter sensor 1014 and/or receiver sensor 1028 detect and/or identify conditions of the electronic device 1022, the receiver 1020, the transmitter 1002, and/or a transmission field. In some embodiments, data generated by the transmitter sensor 1014 and/or receiver sensor 1028 is used by the transmitter 1002 to determine appropriate adjustments to values of one or more waveform characteristics used to transmit the power waves 1016. Data from transmitter sensor 1014 and/or receiver sensor 1028 received by the transmitter 1002 includes, e.g., raw sensor data and/or sensor data processed by a processor 1004, such as a sensor processor. Processed sensor data includes, e.g., determinations based upon sensor data output. In some embodiments, sensor data received from sensors that are external to the receiver 1020 and the transmitters 1002 is also used (such as thermal imaging data, information from optical sensors, and others).

Figure 11A:
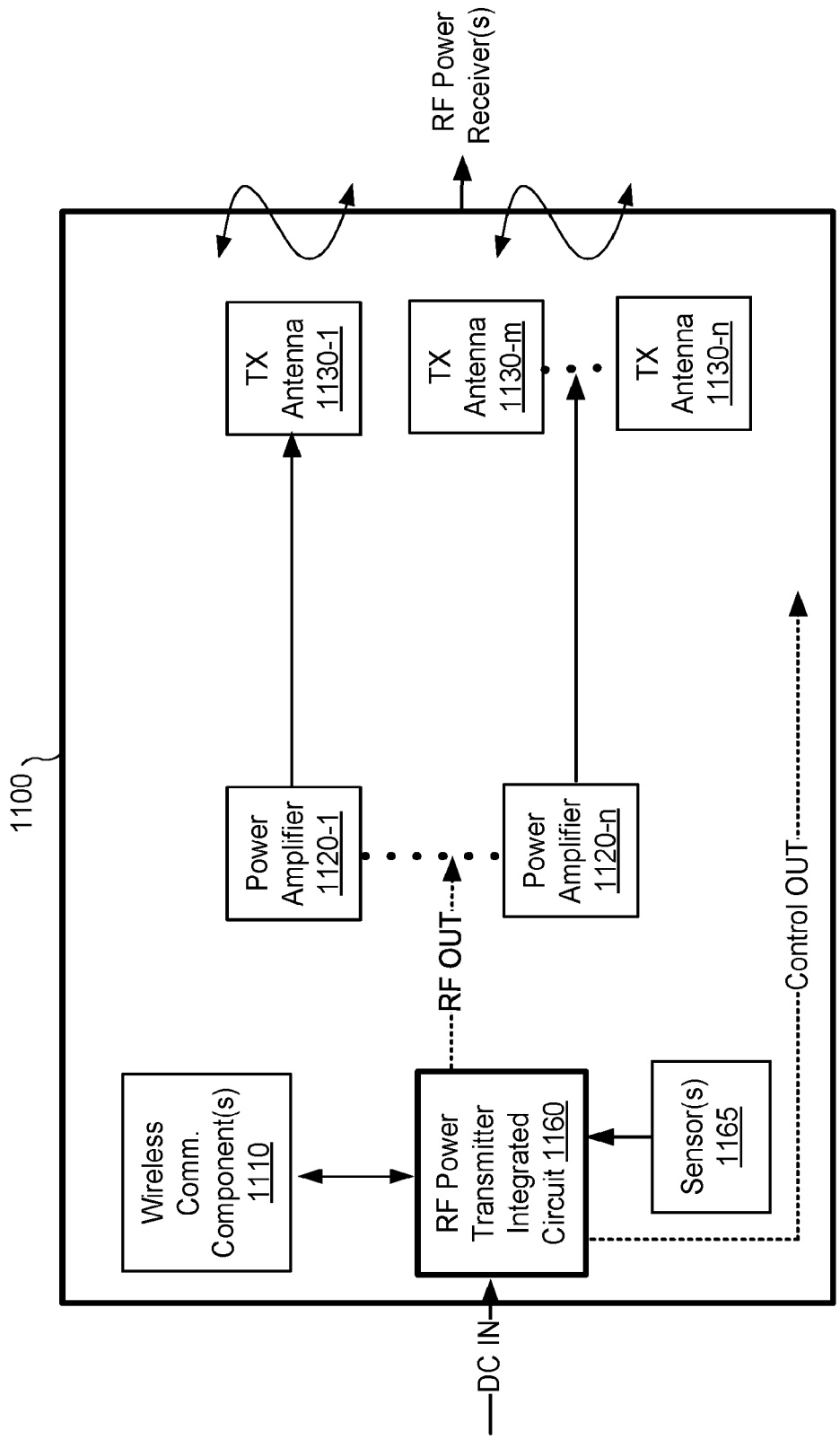
FIG. 11A is a block diagram of a wireless-power transmitter, in accordance with some embodiments.

FIG. 11A is a block diagram of a wireless-power transmitter, in accordance with some embodiments. The block diagram of a wireless-power transmitter 1100 corresponds to an example of the components that can be included within the wireless-power transmitter 1002 described above in reference to FIG. 10. The wireless-power transmitter 1002 can be referred to herein as a near-field (NF) power transmitter device, transmitter, power transmitter, or wireless-power transmitter device. The wireless-power transmitter 1002 includes one or more of one or more communications components 1110, one or more power amplifier units 1120-1, . . . 1120-n, one or more power-transfer elements (e.g., such as antennas 1130-1 to 1130-n (which can be instances of the transmitter antenna elements 1036; FIGS. 1-12D)), an RF Power Transmitter Integrated Circuit (RFIC) 1160 (e.g., analogous to controller 1040 FIG. 10), and one or more sensors 1165.

In some embodiments, the communication component(s) 1110 (e.g., wireless communication components, such as WI-FI or BLUETOOTH radios) enable communication between the wireless-power transmitter 1100 and one or more communication networks. In some embodiments, the communication component(s) 1110 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Figure 13:
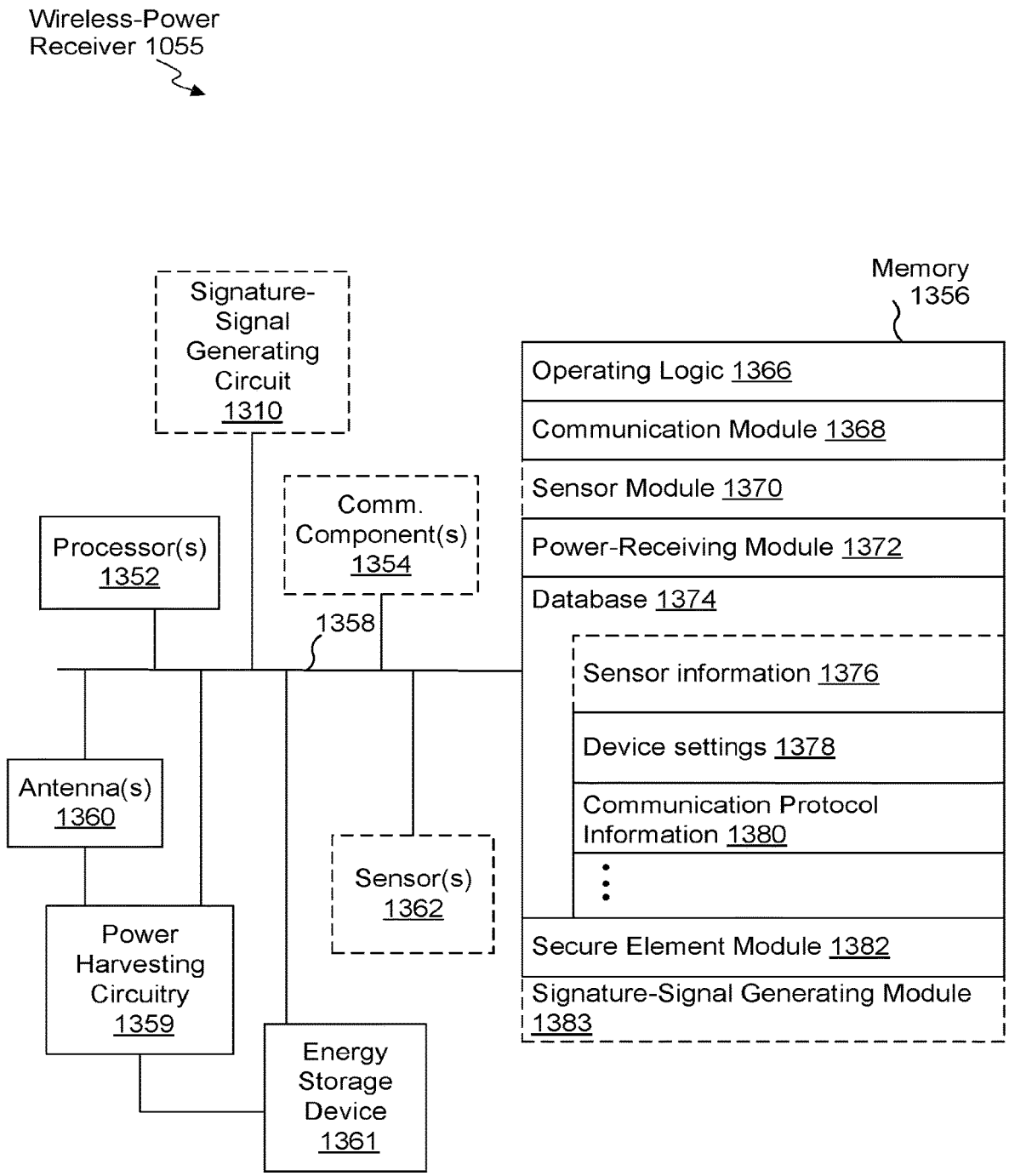
FIG. 13 is a block diagram illustrating a representative wireless-power receiver, in accordance with some embodiments.

In some embodiments, the communication component(s) 1110 receives charging information from a wireless-power receiver (or from an electronic device configured to be charged by the wireless-power receiver; e.g., a wireless-power receiver 1055 described in reference to FIG. 13). In some embodiments, the charging information is received in a packet of information that is received in conjunction with an indication that the wireless-power receiver is located within one meter of the wireless-power transmitter 1035 in FIG. 14. In some embodiments, the charging information includes the location of the wireless-power receiver 1055 within the transmission field of the wireless-power transmitter 1035 (or the surrounding area within the communications component(s) range). For example, communication components 1110, such as BLE communications paths operating at 2.4 GHZ, to enable the wireless-power transmitter 1035 to monitor and track the location of the wireless-power receiver 1055. The location of the wireless-power receiver 1055 can be monitored and tracked based on the charging information received from the wireless-power receiver 1055 via the communications components 1110.

In some embodiments, the charging information indicates that a wireless-power receiver 1055 is authorized to receive wirelessly-delivered power from the wireless-power transmitter 1035. More specifically, the wireless-power receiver can use a wireless communication protocol (such as BLE) to transmit the charging information as well as authentication information to the one or more integrated circuits (e.g., RFIC 1160) of the wireless-power transmitter 1035. In some embodiments, the charging information also includes general information such as charge requests from the receiver, the current battery level, charging rate (e.g., effectively transmitted power or electromagnetic energy successfully converted to usable energy), device specific information (e.g., temperature, sensor data, receiver requirements or specifications, and/or other receiver specific information), etc.

In some instances, the communication component(s) 1110 are not able to communicate with wireless-power receivers for various reasons, e.g., because there is no power available for the communication component(s) 1110 to use for the transmission of data signals or because the wireless-power receiver itself does not actually include any communication component of its own. As such, in some embodiments, the wireless-power transmitters 1035 described herein are still able to uniquely identify different types of devices and, when a wireless-power receiver 1055 is detected, figure out if that the wireless-power receiver 1055 is authorized to receive wireless-power (e.g., by measuring impedances, reflected power, and/or other techniques).

The one or more power amplifiers 1120 are configured to amplify an electromagnetic signal that is provided to the one or more antennas 1130. In some embodiments, the power amplifier 1120 used in the power transmission system controls both the efficiency and gains of the output of the power amplifier. In some embodiments, the power amplifier used in the power transmission system is a class E power amplifier 1120. In some embodiments, the power amplifier 1120 used in the power transmission system is a Gallium Nitride (GaN) power amplifier. In some embodiments, the wireless-power transmitters 1035 is configured to control operation of the one or more power amplifiers 1120 when they drive one or more antennas 1130. In some embodiments, one or more of the power amplifiers 1120 are a variable power amplifier including at least two power levels. In some embodiments, a variable power amplifier includes one or more of a low power level, median power level, and high power level. As discussed below in further detail, in some embodiments, the wireless-power transmitters 1035 is configured to select power levels of the one or more power amplifiers. In some embodiments, the power (e.g., electromagnetic power) is controlled and modulated at the wireless-power transmitters 1035 via switch circuitry as to enable the wireless-power transmitters 1035 to send electromagnetic energy to one or more wireless receiving devices (e.g., wireless-power receivers 1055) via the one or more antennas 1130.

In some embodiments, the output power of the single power amplifier 1120 is equal or greater than 2 W. In some embodiments, the output power of the single power amplifier 1120 is equal or less than 15 W. In some embodiments, the output power of the single power amplifier 1120 is greater than 2 W and less than 15 W. In some embodiments, the output power of the single power amplifier 1120 is equal or greater than 4 W. In some embodiments, the output power of the single power amplifier 1120 is equal or less than 8 W. In some embodiments, the output power of the single power amplifier 1120 is greater than 4 W and less than 8 W. In some embodiments, the output power of the single power amplifier 1120 is greater than 8 W and up to 50 W.

In some embodiments, by using the single power amplifier 1120 with an output power range from 2 W to 15 W, the electric field within the power transmission range of the antenna 1130 controlled by the single power amplifier 1120 is at or below a SAR value of 1.6 W/kg, which is in compliance with the FCC (Federal Communications Commission) SAR requirement in the United States. In some embodiments, by using a single power amplifier 1120 with a power range from 2 W to 15 W, the electric field within the power transmission range of the antenna 1130 controlled by the single power amplifier 1120 is at or below a SAR value of 2 W/kg, which is in compliance with the IEC (International Electrotechnical Commission) SAR requirement in the European Union. In some embodiments, by using a single power amplifier 1120 with a power range from 2 W to 15 W, the electric field within the power transmission range of the antenna 1130 controlled by the single power amplifier 1120 is at or below a SAR value of 0.8 W/kg. In some embodiments, by using a single power amplifier 1120 with a power range from 2 W to 15 W, the electric field within the power transmission range of the antenna 1130 controlled by the single power amplifier 1120 is at or below any level that is regulated by relevant rules or regulations. In some embodiments, the SAR value in a location of the radiation profile of the antenna decreases as the range of the radiation profile increases.

In some embodiments, the radiation profile generated by the antenna controlled by a single power amplifier is defined based on how much usable power is available to a wireless-power receiver when it receives electromagnetic energy from the radiation profile (e.g., rectifies and converts the electromagnetic energy into a usable DC current), and the amount of usable power available to such a wireless-power receivers 1055 can be referred to as the effective transmitted power of an electromagnetic signal. In some embodiments, the effective transmitted power of the electromagnetic signal in a predefined radiation profile is at least 0.5 W. In some embodiments, the effective transmitted power of the signal in a predefined radiation profile is greater than 1 W. In some embodiments, the effective transmitted power of the signal in a predefined radiation profile is greater than 2 W. In some embodiments, the effective transmitted power of the signal in a predefined radiation profile is greater than 5 W. In some embodiments, the effective transmitted power of the signal in a predefined radiation profile is less or equal to 4 W.

Figure 11B:
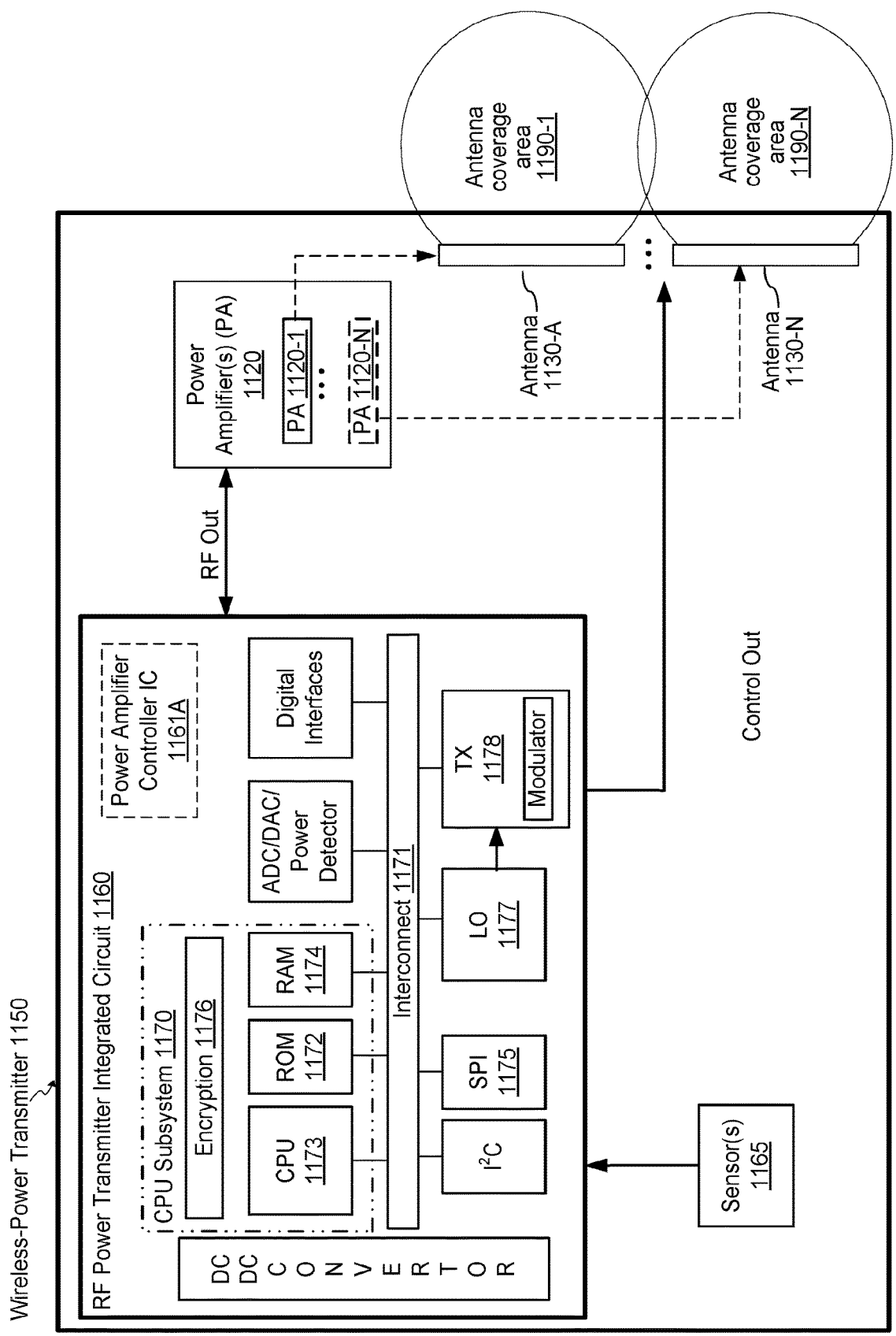
FIG. 11B is a block diagram of another wireless-power transmitter including an RF power transmitter integrated circuit, one or more sensors, one or more antennas, and/or a power amplifier, in accordance with some embodiments.

FIG. 11B is a block diagram of another wireless-power transmitter 1150 (e.g., wireless-power receiver 1035) including an RF power transmitter integrated circuit 1160, one or more sensors 1165, one or more antennas 1130, and/or a power amplifier 1120 in accordance with some embodiments. For ease of discussion and illustration, the other wireless-power transmitters 1150 can be an instance of the wireless-power transmitter devices described above in reference to FIGS. 1-13, and includes one or more additional and/or distinct components, or omits one or more components. In some embodiments, the RFIC 1160 includes a CPU subsystem 1170, an external device control interface, a subsection for DC to power conversion, and analog and digital control interfaces interconnected via an interconnection component, such as a bus or interconnection fabric block 1171. In some embodiments, the CPU subsystem 1170 includes a microprocessor unit (CPU) 1173 with related Read-Only-Memory (ROM) 1172 for device program booting via a digital control interface, e.g., an I2C port, to an external FLASH containing the CPU executable code to be loaded into the CPU Subsystem Random Access Memory (RAM) 1174 (e.g., memory 1006, FIG. 10) or executed directly from FLASH. In some embodiments, the CPU subsystem 1370 also includes an encryption module or block 1176 to authenticate and secure communication exchanges with external devices, such as wireless-power receivers that attempt to receive wirelessly delivered power from the Wireless-power transmitters 1035. In some embodiments, the wireless-power transmitters 1035 may also include a temperature monitoring circuit (not shown) that is in communication with the CPU subsystem 1170 to ensure that the wireless-power transmitters 1035 remains within an acceptable temperature range. For example, if a determination is made that the wireless-power transmitters 1035 has reached a threshold temperature, then operation of the wireless-power transmitters 1035 may be temporarily suspended until the wireless-power transmitters 1035 falls below the threshold temperature.

In some embodiments, the RFIC 1160 also includes (or is in communication with) a power amplifier controller IC (PAIC) 1161A that is responsible for controlling and managing operations of a power amplifier, including, but not limited to, reading measurements of impedance at various measurement points within the power amplifier, instructing the power amplifier to amplify the electromagnetic signal, synchronizing the turn on and/or shutdown of the power amplifier, optimizing performance of the power amplifier, protecting the power amplifier, and other functions discussed herein. In some embodiments, the impedance measurement are used to allow the wireless-power transmitters 1035 (via the RFIC 1160 and/or PAIC 1161A) to detect of one or more foreign objects, optimize operation of the one or more power amplifiers, assess one or more safety thresholds, detect changes in the impedance at the one or more power amplifiers, detect movement of the receiver within the wireless transmission field, protect the power amplifier from damage (e.g., by shutting down the power amplifier, changing a selected power level of the power amplifier, and/or changing other configurations of the wireless-power transmitters 1035), classify a receiver (e.g., authorized receivers, unauthorized receivers, and/or receiver with an object), compensate for the power amplifier (e.g., by making hardware, software, and/or firmware adjustments), tune the wireless-power transmitters 1035, and/or other functions.

In some embodiments, the PAIC 1161A may be on the same integrated circuit as the RFIC 1160. Alternatively, in some embodiments, the PAIC 1161A may be on its own integrated circuit that is separate from (but still in communication with) the RFIC 1160. In some embodiments, the PAIC 1161A is on the same chip with one or more of the power amplifiers 1120. In some other embodiments, the PAIC 1161A is on its own chip that is a separate chip from the power amplifiers 1320. In some embodiments, the PAIC 1161A may be on its own integrated circuit that is separate from (but still in communication with) the RFIC 1160 enables older systems to be retrofitted. In some embodiments, the PAIC 1161A as a standalone chip communicatively coupled to the RFIC 1160 can reduce the processing load and potential damage from over-heating. Alternatively or additionally, in some embodiments, it is more efficient to design and use two different ICs (e.g., the RFIC 1160 and the PAIC 1161A).

In some embodiments, executable instructions running on the CPU (such as those shown in the memory 1206 in FIG. 12, and described below) are used to manage operation of the wireless-power transmitters 1035 and to control external devices through a control interface, e.g., SPI control interface 1175, and the other analog and digital interfaces included in the RFIC 1160. In some embodiments, the CPU subsystem 1170 also manages operation of the subsection of the RFIC 1160, which includes a local oscillator (LO) 1177 and a transmitter (TX) 1178. In some embodiments, the LO 1177 is adjusted based on instructions from the CPU subsystem 1170 and is thereby set to different desired frequencies of operation, while the TX converts, amplifies, modulates the output as desired to generate a viable power level.

In some embodiments, the RFIC 1360 and/or PAIC 1161A provide the viable power level (e.g., via the TX 1178) directly to the one or more power amplifiers 1120 and does not use any beam-forming capabilities (e.g., bypasses/disables a beam-forming IC and/or any associated algorithms if phase-shifting is not required, such as when only a single antenna 1130 is used to transmit power transmission signals to a wireless-power receiver 1055). In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase. In some embodiments, the RFIC 1160 and/or PAIC 1161A regulate the functionality of the power amplifiers 1120 including adjusting the viable power level to the power amplifiers 1120, enabling the power amplifiers 1120, disabling the power amplifiers 1120, and/or other functions.

Various arrangements and couplings of power amplifiers 1120 to antenna coverage areas 1190 allow the wireless-power receiver 1055 to sequentially or selectively activate different antenna coverage areas 1190 (i.e., power transfer points) in order to determine the most efficient and safest (if any) antenna coverage area 1190 to use for transmitting wireless-power to a wireless-power receiver 1055.

In some embodiments, the one or more power amplifiers 1120 are also controlled by the CPU subsystem 1170 to allow the CPU 1173 to measure output power provided by the power amplifiers 1120 to the antenna coverage areas (i.e., plurality of power-transfer points 202) of the wireless-power transmitter 1035. In some embodiments, the one or more power amplifiers 1120 are controlled by the CPU subsystem 1170 via the PAIC 1161A. In some embodiments, the power amplifiers 1120 may include various measurement points that allow for at least measuring impedance values that are used to enable the foreign object detection techniques, receiver and/or foreign object movement detection techniques, power amplifier optimization techniques, power amplifier protection techniques, receiver classification techniques, power amplifier impedance detection techniques, and/or other safety techniques described in commonly-owned U.S. patent application Ser. No. 16/932,631, which is incorporated by reference in its entirety for all purposes.

Figure 12:
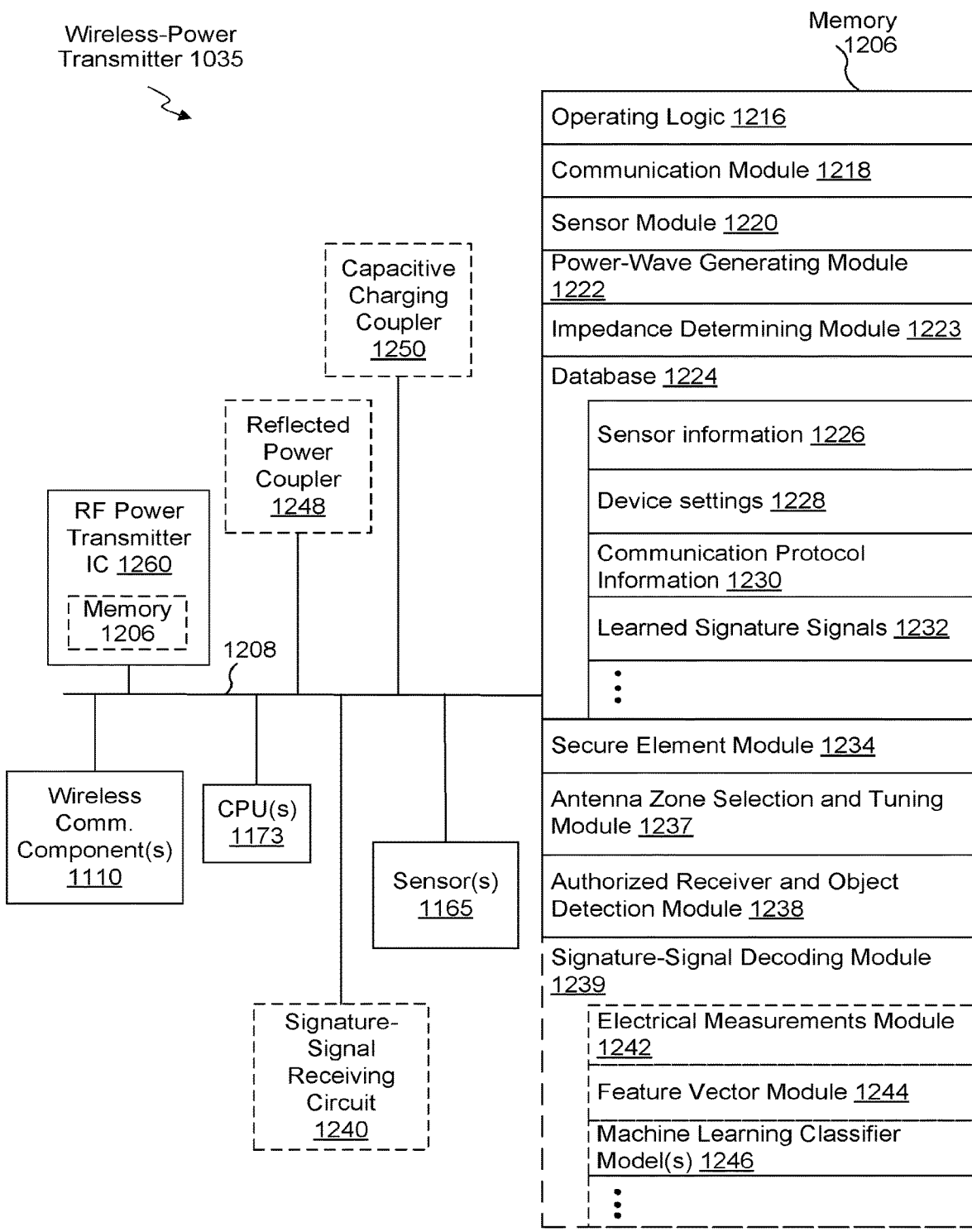
FIG. 12 is a block diagram illustrating one or more components of a wireless-power transmitter, in accordance with some embodiments.

FIG. 12 is a block diagram illustrating one or more components of a wireless-power transmitter 1035, in accordance with some embodiments. In some embodiments, the wireless-power transmitter 1035 includes an RFIC 1160 (and the components included therein, such as a PAIC 1161A and others described above in reference to FIGS. 11A-11B), memory 1206 (which may be included as part of the RFIC 1160, such as nonvolatile memory 1206 that is part of the CPU subsystem 1170), one or more CPUs 1173, and one or more communication buses 1208 for interconnecting these components (sometimes called a chipset). In some embodiments, the wireless-power transmitter 1035 includes one or more sensors 1165. In some embodiments, the wireless-power transmitter 1035 includes one or more output devices such as one or more indicator lights, a sound card, a speaker, a small display for displaying textual information and error codes, etc. In some embodiments, the wireless-power transmitter 1035 includes a location detection device, such as a GPS other geo-location receiver, for determining the location of the wireless-power transmitter 1035.

In some embodiments, the one or more sensors 1165 include one or more capacitive sensors, inductive sensors, ultrasound sensors, photoelectric sensors, time-of-flight sensors (e.g., IR sensors, ultrasonic time-of-flight sensors, phototransistor receiver systems, etc.), thermal radiation sensors, ambient temperature sensors, humidity sensors, IR sensors or IR LED emitter, occupancy sensors (e.g., RFID sensors), ambient light sensors, motion detectors, accelerometers, heat detectors, hall sensors, proximity sensors, sound sensors, pressure detectors, light and/or image sensors, and/or gyroscopes, as well as integrated sensors in one or more antennas.

In some embodiments, the wireless-power transmitter 1035 further includes an optional signature-signal receiving circuit 1240, an optional reflected power coupler 1248, and an optional capacitive charging coupler 1250.

The memory 1406 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1206, or alternatively the non-volatile memory within memory 1206, includes a non-transitory computer-readable storage medium. In some embodiments, the memory 1206, or the non-transitory computer-readable storage medium of the memory 1406, stores the following programs, modules, and data structures, or a subset or superset thereof:

Operating logic 1216 including procedures for handling various basic system services and for performing hardware dependent tasks;

Communication module 1228 for coupling to and/or communicating with remote devices (e.g., remote sensors, transmitters, receivers, servers, mapping memories, etc.) in conjunction with wireless communication component(s) 1110;

Sensor module 1220 for obtaining and processing sensor data (e.g., in conjunction with sensor(s) 1365) to, for example, determine or detect the presence, velocity, and/or positioning of object in the vicinity of the wireless-power transmitter 1035 as well as classify a detected object;

Power-wave generating module 1222 for generating and transmitting power transmission signals (e.g., in conjunction with antenna coverage areas 1190 and the antennas 1130 respectively included therein), including but not limited to, forming pocket(s) of energy at given locations, and controlling and/or managing the power amplifier (e.g., by performing one or functions of the PAIC 1361A). Optionally, the power-wave generating module 1222 may also be used to modify values of transmission characteristics (e.g., power level (i.e., amplitude), phase, frequency, etc.) used to transmit power transmission signals by individual antenna coverage areas;

Impedance determining module 1223 for determining an impedance of the power amplifier based on parametric parameters obtained from one or more measurement points within the wireless-power transmitter 1035 (e.g., determining an impedance using one or more Smith charts). Impedance determining module 1223 may also be used to determine the presence of a foreign object, classify a receiver, detect changes in impedances, detect movement of a foreign object and/or receiver, determine optimal and/or operational impedances, as well as a number of other functions describe below;

Database 1224, including but not limited to:
  Sensor information 1226 for storing and managing data received, detected, and/or transmitted by one or more sensors (e.g., sensors 1165 and/or one or more remote sensors);

Device settings 1228 for storing operational settings for the wireless-power transmitter 1035 and/or one or more remote devices including, but not limited to, lookup tables (LUT)s for SAR, e-field roll-off, producing a certain radiation profile from among various radiation profiles, Smith Charts, antenna tuning parameters, and/or values associated with parametric parameters of the wireless-power transmitter 1035 for different configurations (e.g., obtained during simulation, characterization, and/or manufacture tests of the wireless-power transmitter 1035 and/or updated during operation (e.g., learned improvements to the system)). Alternatively, raw values can be stored for future analysis;

Communication protocol information 1230 for storing and managing protocol information for one or more protocols (e.g., custom or standard wireless protocols, such as ZigBee, Z-Wave, etc. and/or custom or standard wired protocols, such as Ethernet); and Optional learned signature signals 1232 for a variety of different wireless-power receivers and other objects (which are not wireless-power receivers).

A secure element module 1234 for determining whether a wireless-power receiver is authorized to receive wirelessly delivered power from the wireless-power transmitter 1035;

An antenna zone selection and tuning module 1237 for coordinating a process of transmitting test power transmission signals to an antenna 1230 (e.g., antenna element 1036) with various antenna coverage areas (i.e., power-transfer points) to determine which antenna coverage area (i.e., power-transfer point) should be used to wirelessly deliver power to various wireless-power receivers as described herein (additional examples and embodiments are provided in reference to FIGS. 9A-9B of PCT Patent Application No. PCT/US2019/015820 (U.S. Pat. No. 10,615,647), which is incorporated by reference in its entirety for all purposes; and also provided in PCT/US2017/065886 (U.S. Pat. No. 10,256,677), which is incorporated by reference in its entirety for all purposes);

An authorized receiver and object detection module 1238 used for detecting various signature signals from wireless-power receivers and from other objects, and then determining appropriate actions based on the detecting of the various signature signals (as is explained in more detail in reference to FIGS. 9A-9B of PCT Patent Application No. PCT/US2019/015820 (U.S. Pat. No. 10,615,647), which is incorporated by reference in its entirety for all purposes; also explained in more detail in PCT/US2017/065886 (U.S. Pat. No. 10,256,677), which is incorporated by reference in its entirety for all purposes); and An optional signature-signal decoding module 1239 used to decode the detected signature signals and determine message or data content. In some embodiments, the module 1239 includes an electrical measurement module 1242 to collect electrical measurements from one or more receivers (e.g., in response to power beacon signals), a feature vector module 1244 to compute feature vectors based on the electrical measurements collected by the electrical measurement module 1239, and/or machine learning classifier model(s) 1246 that are trained to detect and/or classify foreign objects (additional detail provided in commonly-owned U.S. Patent Publication No. 2019/0245389, which is incorporated by reference herein for all purposes).

Each of the above-identified elements (e.g., modules stored in memory 1206 of the wireless-power transmitter 1035) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 1206, optionally, stores a subset of the modules and data structures identified above.

FIG. 13 is a block diagram illustrating a representative wireless-power receiver 1055 (also sometimes interchangeably referred to herein as a receiver, or power receiver), in accordance with some embodiments. In some embodiments, the wireless-power receiver 1055 includes one or more processing units (e.g., CPUs, ASICs, FPGAs, microprocessors, and the like) 1352, one or more communication components 1354, memory 1356, antenna(s) 1360 (which can be instances receiver antenna elements 104; FIGS. 1A-3B), power harvesting circuitry 1359 (e.g., PCB 108; FIGS. 1A-3B), and one or more communication buses 1358 for interconnecting these components (sometimes called a chipset). In some embodiments, the wireless-power receiver 1055 includes one or more optional sensors 1362, similar to the one or sensors 1028 and 1165 described above with reference to FIGS. 10 and 11, respectively. In some embodiments, the wireless-power receiver 1055 includes an energy storage device 1361 for storing energy harvested via the power harvesting circuitry 1359. In various embodiments, the energy storage device 1361 includes one or more batteries, one or more capacitors, one or more inductors, and the like.

In some embodiments, the power harvesting circuitry 1359 includes one or more rectifying circuits and/or one or more power converters. In some embodiments, the power harvesting circuitry 1359 includes one or more components (e.g., a power converter) configured to convert energy from power waves and/or energy pockets to electrical energy (e.g., electricity). In some embodiments, the power harvesting circuitry 1359 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the optional signature-signal generating circuit 1310 includes one or more components as discussed with reference to FIGS. 3A-3D of commonly-owned U.S. Patent Publication No. 2019/0245389, which is incorporated by reference in its entirety for all purposes.

In some embodiments, the antenna(s) 1360 include one or more helical antennas, such as those described in detail in commonly-owned U.S. Pat. No. 10,734,717, which is incorporated by reference in its entirety for all purposes (e.g., with particular reference to FIGS. 2-4B, and elsewhere).

In some embodiments, the wireless-power receiver 1055 includes one or more output devices such as one or more indicator lights, a sound card, a speaker, a small display for displaying textual information and error codes, etc. In some embodiments, the wireless-power receiver 1055 includes a location detection device, such as a GPS (global positioning satellite) or other geo-location receiver, for determining the location of the wireless-power transmitter 1055.

In various embodiments, the one or more sensors 1362 include one or more thermal radiation sensors, ambient temperature sensors, humidity sensors, IR sensors, occupancy sensors (e.g., RFID sensors), ambient light sensors, motion detectors, accelerometers, and/or gyroscopes. It is noted that the foreign object detection techniques can operate without relying on the one or more sensor(s) 1362.

The communication component(s) 1354 enable communication between the wireless-power receiver 1055 and one or more communication networks. In some embodiments, the communication component(s) 1354 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. It is noted that the foreign object detection techniques can operate without relying on the communication component(s) 1354.

The communication component(s) 1354 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 1356 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1356, or alternatively the non-volatile memory within memory 1356, includes a non-transitory computer-readable storage medium. In some embodiments, the memory 1356, or the non-transitory computer-readable storage medium of the memory 1356, stores the following programs, modules, and data structures, or a subset or superset thereof:

Operating logic 1366 including procedures for handling various basic system services and for performing hardware dependent tasks;

Communication module 1368 for coupling to and/or communicating with remote devices (e.g., remote sensors, transmitters, receivers, servers, mapping memories, etc.) in conjunction with communication component(s) 1354;

Optional sensor module 1370 for obtaining and processing sensor data (e.g., in conjunction with sensor(s) 1362) to, for example, determine the presence, velocity, and/or positioning of the wireless-power receiver 1055, a wireless-power transmitter 1055, or an object in the vicinity of the wireless-power transmitter 1055;

Wireless power-receiving module 1372 for receiving (e.g., in conjunction with antenna(s) 1360 and/or power harvesting circuitry 1359) energy from, capacitively-conveyed electrical signals, power waves, and/or energy pockets; optionally converting (e.g., in conjunction with power harvesting circuitry 1359) the energy (e.g., to direct current); transferring the energy to a coupled electronic device; and optionally storing the energy (e.g., in conjunction with energy storage device 1361);

Database 1374, including but not limited to:
  Sensor information 1376 for storing and managing data received, detected, and/or transmitted by one or more sensors (e.g., sensors 1362 and/or one or more remote sensors);
  Device settings 1378 for storing operational settings for the wireless-power transmitter 1055, a coupled electronic device, and/or one or more remote devices; and
  Communication protocol information 1380 for storing and managing protocol information for one or more protocols (e.g., custom or standard wireless protocols, such as ZigBee, Z-Wave, etc. and/or custom or standard wired protocols, such as Ethernet);

A secure element module 1382 for providing identification information to the wireless-power transmitter 1035 (e.g., the wireless-power transmitter 1035 uses the identification information to determine if the wireless-power receiver 1304 is authorized to receive wirelessly delivered power); and An optional signature-signal generating module 1383 used to control (in conjunction with the signature-signal generating circuit 1310) various components to cause impedance changes at the antenna(s) 1360 and/or power harvesting circuitry 1359 to then cause changes in reflected power as received by a signature-signal receiving circuit 1240.

Each of the above-identified elements (e.g., modules stored in memory 1356 of the receiver 1304) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 1356, optionally, stores a subset of the modules and data structures identified above. Furthermore, the memory 1356, optionally, stores additional modules and data structures not described above, such as an identifying module for identifying a device type of a connected device (e.g., a device type for an electronic device that is coupled with the receiver 1304).

In some embodiments, the near-field power transmitters disclosed herein may use adaptive loading techniques to optimize power transfer. Such techniques are described in detail in commonly-owned and incorporated-by-reference PCT Application No. PCT/US2017/065886 and, in particular, in reference to FIGS. 5-8 and 12-15 of PCT Application No. PCT/US2017/065886.

In some embodiments, the wireless-power transmitter 1055 is coupled to or integrated with an electronic device, such as shelving unit, a pen, a marker, a phone, a tablet, a laptop, a hearing aid, smart glasses, headphones, computer accessories (e.g., mouse, keyboard, remote speakers), and/or other electrical devices. In some embodiments, the wireless-power transmitter 1055 is coupled to or integrated with small consumer device, such as a fitness band, a smart watch, and/or other wearable product. Alternatively, in some embodiments, the wireless-power transmitter 1055 is an electronic device.

In accordance with some embodiments, a wireless-power harvester integrated in a small form-factor device (e.g., less than or equal to 100 mm in length, 70 mm in width and 30 mm in depth) (e.g., 50-100 mm in length, 35-70 mm in width, and 15-30 mm in depth) (e.g., an example small form-factor device such as the electronic device 102 shown in FIGS. 1A-1B, 2, and 3A-3B), comprises a stamped metal harvesting antenna configured to harvest radio frequency (RF) power waves, the stamped metal antenna formed into a meandering shape (e.g., FIGS. 1A-1B, 2, and 3A-3B each illustrate harvester antenna 104 that follows a meandering path). The meandering shape includes a predetermined number of turns (e.g., FIGS. 1A-1B, 2, and 3A-3B each illustrate harvester antenna 104 having at least two turns). Specifically, FIG. 1B shows in a bounding box a first turn 161. A first end of the meandering shape is a free end positioned within free space of a housing of a small form-factor device, and a second end of the meandering shape is coupled to a PCB that includes electrical components for operating and powering the small form-factor device. The PCB configured to operate as a ground plane for the stamped metal antenna (e.g., FIGS. 1B and 2 illustrate harvester antenna 104 coupled to the PCB 108 of the electronic device 102 and a receiver integrated circuit 156). An intermediate portion, disposed between the first end and the second end, of the meandering shape is coupled to power-conversion circuitry that is separate from the PCB, the power-conversion circuitry is configured to convert the one or more RF power waves harvested by the stamped metal harvesting antenna into usable energy for charging a battery of the small form-factor device or for powering the small form-factor device (e.g., FIGS. 1B and 2 illustrate an intermediate portion 164 of the receiving antenna 104 being coupled to a receiver integrated circuit 156, and FIG. 10 illustrates a battery 1030).

In some embodiments, the small form-factor device is a digital price tag including a display (e.g., an e-ink display, an LCD display, etc.) powered by the battery. The display and the battery being coupled to the PCB. For example, FIG. 1A illustrates that the electronic device 102 includes a display 106 that is configured to be a digital price tag.

In some embodiments, the small form-factor device is a digital thermometer powered by the battery. In some embodiments, the thermometer can include a display and/or provide data to a computer or server. In some embodiments, other measurement or stock tracking devices can be used. For example, a scale, a counter (e.g., identifying a number of object on a shelf). In some embodiments, shopping carts with displays can also be included.

In some embodiments, the power-conversion circuitry is on a substrate distinct from the PCB.

In some embodiments, the stamped metal harvesting antenna is quasi omnidirectional. For example, FIG. 1B illustrates that the harvester antenna 104 is quasi omnidirectional and configured to receive wireless power with any polarization. In some embodiments, the antenna is configured to receive wireless power with any polarization.

In some embodiments, the stamped metal harvesting antenna is coupled to an edge of the PCB. For example, FIGS. 1B and 2 illustrate harvester antenna 104 coupled to the PCB 108 of the electronic device 102 and a receiver integrated circuit 156. In some embodiments, the harvesting antenna can be attached to any edge portion of the PCB.

In some embodiments, the stamped metal harvesting antenna is modular, such that it can be interchangeably coupled with the PCB and the power-conversion circuitry at a first point in time, and separately coupled with a different PCB of a different small form-factor device and different power-conversion circuitry at a second point in time that is distinct from the first point in time. In some embodiments, the harvesting antenna can be designed to accommodate any configuration of the small form-factor device. In some embodiments, the harvesting antenna is easy and inexpensive to manufacture. In some embodiments, the harvesting antenna can be installed by either the manufacturer of the harvesting antenna or the purchaser of the harvesting antenna (e.g., the client).

In some embodiments, the stamped metal antenna occupies a first area of the housing of the small form-factor device that is adjacent to a second area of the housing occupied by the PCB, and the first and second areas are non-overlapping. For example, FIGS. 1B, 2, and 3A-3B illustrates the PCB 108 being in a non-overlapping adjacent location to the antenna 104. Specifically, FIG. 1B shows a first area 109 that contains the PCB 108, and a second area 111 that contains the antenna 104 and related componentry.

In some embodiments, the RF power waves have a centering operating frequency of 918 MHz.

In some embodiments, the stamped metal harvesting antenna has a gain of at least 2 dB. For example, FIG. 4 illustrates a harvesting antenna radiation pattern having a gain of at least 2 dB.

In some embodiments, the predetermined number of turns is two. For example, FIGS. 1A-1B, 2, and 3A-3B each illustrate harvester antenna 104 having at least two turns.

In some embodiments, the battery is a 60 to 100 mAh battery (e.g., battery 1030 in FIG. 10).

In some embodiments, the stamped metal harvesting antenna has a thickness of 1 mm to 2 mm.

In some embodiments, the stamped metal harvesting antenna has a width of 0.5 inch to 2 inches.

In some embodiments, the small form-factor device includes a communications component that is coupled to the PCB, the communication component configured to receive data that allows the small form-factor device to display graphical information. For example, electronic device 102 includes a communications component (e.g., communications component 1036 and/or 1044; FIG. 10). In some embodiments, the data regarding the number of objects on a shelf is displayed. In some embodiments, the display can display information for updating a price or other information (e.g., product name or description). In some embodiments, the display can be used to display an estimate of the price of a virtual shopping cart/list of a shopper in front of the display.

In some embodiments, the graphical information is displayed using a text-only display of the small form-factor device. In some embodiments, the small form-factor device is further configured to communicatively couple to a wireless-power transmitter and provide charging information (e.g., battery life, amount of power received, charge requests, etc.).

In another aspect, a small form-factor device (e.g., less than or equal to 100 mm in length, 70 mm in width and 30 mm in depth) (e.g., 50-100 mm in length, 35-70 mm in width, and 15-30 mm in depth), comprises a wireless-power harvester. The wireless-power harvester includes a stamped metal harvesting antenna configured to harvest radio frequency (RF) power waves, the stamped metal antenna formed into a meandering shape. The meandering shape includes a predetermined number of turns, a first end of the meandering shape is a free end positioned within free space of a housing of a small form-factor device, and a second end of the meandering shape is coupled to a PCB that includes electrical components for operating and powering the small form-factor device. The PCB is configured to operate as a ground plane for the stamped metal antenna. In some embodiments, an intermediate portion, disposed between the first end and the second end, of the meandering shape is coupled to power-conversion circuitry that is separate from the PCB. The power-conversion circuitry configured to convert the one or more RF power waves harvested by the stamped metal harvesting antenna into usable energy for charging a battery of the small form-factor device or for powering the small form-factor device.

In another aspect, a shelving-mounted wireless-power-transmitting device is configured to transmit RF power waves to a wireless-power harvester device that is integrated in a small form-factor device. For example, FIG. 5 illustrates a front view 500 of a shelving system 501 that includes a shelving-mounted wireless-power transmitter system 504 placed at the top of the shelving system 501 for transmitting RF power waves to one or more electronic devices 102. In some embodiments, the wireless-power harvester device integrated in the small form-factor device (e.g., less than or equal to 100 mm in length, 70 mm in width and 30 mm in depth) (e.g., 50-100 mm in length, 35-70 mm in width, and 15-30 mm in depth) (e.g., an example small form-factor device such as the electronic device 102 shown in FIGS. 1A-1B, 2, and 3A-3B), includes a stamped metal harvesting antenna configured to harvest radio frequency (RF) power waves, the stamped metal antenna formed into a meandering shape (e.g., FIGS. 1A-1B, 2, and 3A-3B each illustrate harvester antenna 104 that follows a meandering path). The meandering shape of the stamped metal harvesting antenna includes a predetermined number of turns. The stamped metal harvesting antenna includes a first end of the meandering shape is a free end positioned within free space of a housing of a small form-factor device, and a second end of the meandering shape is coupled to a PCB that includes electrical components for operating and powering the small form-factor device. The PCB configured to operate as a ground plane for the stamped metal antenna (e.g., FIGS. 1B and 2 illustrate harvester antenna 104 coupled to the PCB 108 of the electronic device 102 and a receiver integrated circuit 156). An intermediate portion, disposed between the first end and the second end, of the meandering shape is coupled to power-conversion circuitry that is separate from the PCB. The power-conversion circuitry is configured to convert the one or more RF power waves harvested by the stamped metal harvesting antenna into usable energy for charging a battery of the small form-factor device or for powering the small form-factor device (e.g., FIGS. 1B and 2 illustrate an intermediate portion 164 of the receiving antenna 104 being coupled to a receiver integrated circuit 156, and FIG. 10 illustrates a battery 1030).

In some embodiments, the shelving-mounted wireless-power-transmitting device comprises a mounting structure (e.g., mounting structure 503 shown at least in FIG. 5) that is mountable to a shelving unit (e.g., shelving system 501 shown in FIGS. 5-7). The shelving unit has a predetermined height and a predetermined width. The mounting includes a first end coupled (or integrated) to an outer portion of the shelving unit and a second end opposite the first end extending a predetermined distance away from the outer portion of the shelving unit. For example, FIGS. 5-7 illustrate shelving-mounted wireless power transmitting systems with shelving systems having predetermined height and widths. The second end includes a ground plane (dimensions of the ground plane are based on the size of the transmitting device; e.g., 8 inches by 2 inches). A first plurality of conductive segments has a first shape and a first size (e.g., FIG. 7 shows conductive segments of three different sizes (e.g., a first number of conductive segments 704, a second number of conductive segments 708, and third number of conductive segments 720)), each of the first plurality of conductive segments is disposed over the ground plane. A second plurality of conductive segments have a second shape and a second size, the second shape being distinct from the first shape and the second size being distinct from the first size. A respective conductive segment of the second plurality of conductive segments separates adjacent conductive segments of the first plurality of conductive segments from one another (e.g., a first number of conductive segments 704, a second number of conductive segments 708, and third number of conductive segments 720). The first and second pluralities of conductive segments are disposed over the ground plane to form an antenna that is configured to radiate radio-frequency (RF) wireless power waves towards the shelving unit such that (i) the predetermined height and the predetermined width of the shelving unit are within a coverage area (e.g., up to 15 feet in a first direction (e.g., a horizontal direction and up to 20 feet in a second direction (e.g., a vertical direction along the height of the shelving unit) of the RF wireless power waves, and (ii) a bottom shelf of the shelving unit receives at least a threshold amount of RF energy from the RF wireless power waves. For example, at least enough RF energy to allow for a harvester to harvest enough usable power and/or charge for operating a digital price tag (e.g., an e-ink display and associated hardware). For example, FIG. 7 shows that the first coverage area 706, the second coverage area 714, and the third coverage area 722 each show the bottom shelf receiving at least a threshold amount of RF energy. In some embodiments, the usable power can be between 0.5 milliwatts and to over few tenths of Watt.

In accordance with some embodiments, a shelving-mounted wireless-power-transmitting device comprises a mounting structure (e.g., mounting structure 503 shown at least in FIG. 5) that is mountable to a shelving unit (e.g., shelving system 501 shown in FIGS. 5-7). The shelving unit has a predetermined height and a predetermined width. The mounting includes a first end coupled or integrated to an outer portion of the shelving unit and a second end opposite the first end extending a predetermined distance away from the outer portion of the shelving unit. For example, FIGS. 5-7 illustrate shelving-mounted wireless power transmitting systems with shelving systems having predetermined height and widths. The second end includes a ground plane (e.g., dimensions of the ground plane are based on the size of the transmitting device; e.g., 8 inches by 2 inches). The second end includes a first plurality of conductive segments having a first shape and a first size. For example, FIG. 7 shows conductive segments of three different sizes (e.g., a first number of conductive segments 704, a second number of conductive segments 708, and third number of conductive segments 720). The second end includes a second plurality of conductive segments that have a second shape and a second size, the second shape is distinct from the first shape and the second size is distinct from the first size. A respective conductive segment of the second plurality of conductive segments separates adjacent conductive segments of the first plurality of conductive segments from one another. For example, a first number of conductive segments 704, a second number of conductive segments 708, and third number of conductive segments 720. In some embodiments, the second end includes the first and second pluralities of conductive segments that are disposed over the ground plane to form an antenna that is configured to radiate radio-frequency (RF) wireless power waves towards the shelving unit such that (i) the predetermined height and the predetermined width of the shelving unit are within a coverage area (e.g., up to 15 feet in a first direction (e.g., a horizontal direction and up to 20 feet in a second direction (e.g., a vertical direction) of the RF wireless power waves, and (ii)

a bottom shelf of the shelving unit receives at least a threshold amount of RF energy from the RF wireless power waves (e.g., at least enough RF energy to allow for a harvester to harvest enough usable power and/or charge for operating a digital price tag (e.g., an e-ink display and associated hardware)). For example, FIG. 7 shows that the first coverage area 706, the second coverage area 714, and the third coverage area 722 each show the bottom shelf receives at least a threshold amount of RF energy. In some embodiments, the usable power can be between 0.5 milliwatts and few tenths of a watt.

In some embodiments, each conductive segment of the first plurality of conductive segments and the second plurality of conductive segments are separated by a predetermined gap. In some embodiments, the gap is between 0.1 inches and 0.5 inches. The gap distance is determined based on the predetermined height and the predetermined width of the shelving structure. In some embodiments, each segment of the first plurality of conductive segments or each segment of the second plurality of conductive segments are coupled together via a feedline. In some embodiments, each conductive segment has a length and width. In some embodiments, the conductive segment length is approximately 1.5 inches and the antenna element width is approximately 0.5 inches. In some embodiments, the conductive segment length and width is determined based on the predetermined height and the predetermined width of the shelving unit's structure.

In some embodiments, the first shape and the second shape is a meandering path that produces a rectangular shape (e.g., the first shape is a meandering 'U' shape as shown in FIG. 7 as first number of conductive segments 704, second number of conductive segments 708, and third number of conductive segments 716). In some embodiments, the conductive segments are a continuous piece of metal.

In some embodiments, the first size is larger than the second size. In some embodiments, the size is adjusted depending on the required coverage area (e.g., a larger shelf coverage area corresponds to a larger sized plurality of conductive segments).

In some embodiments, the first plurality conductive segments and the second plurality of conductive segments each include a predetermined number of two or more conductive segments (e.g., a first number of conductive segments 704, a second number of conductive segments 708, and third number of conductive segments 720). In some embodiments, the predetermined number of conductive segments is between 5 to 15 antenna elements. In some embodiments, more than 15 antenna elements can be used. In some embodiments, the predetermined number of antenna elements is based on the predetermined height and the predetermined width of the shelving unit's structure.

In some embodiments, the outer portion of the shelving structure is a centrally located between two posts of the shelving structure. For example, FIG. 5 and FIG. 7 show the outer portion (e.g., mounting structure 503) of the shelving structure being centrally located.

In some embodiments, respective numbers of segments in the first and second pluralities of conductive segments are adjustable to allow for creating an altered coverage area for the shelving-mounted wireless-power transmitting device.

In some embodiments, a peak gain of the antenna is at least 5.5 dBi and the wireless power waves are radiated using is a center operating frequency of 918 MHZ (e.g., FIG. 6 shows the peak gain being at least 5.5 dBi).

In some embodiments, the first plurality of conductive segments and the second plurality of conductive segments are formed using respective stamped copper plates.

In some embodiments, the first plurality of conductive segments includes a first number of conductive segments, the first number of conductive segments selected based on the predetermined height and width of the shelving unit. For example, FIG. 7 shows conductive segments of three different sizes (e.g., a first number of conductive segments 704, a second number of conductive segments 708, and third number of conductive segments 720). The second plurality of conductive segments includes a second number of conductive segments, the second number also selected based on the predetermined height and width of the shelving unit. For example, FIG. 7 shows conductive segments of three different sizes (e.g., a first number of conductive segments 704, a second number of conductive segments 708, and third number of conductive segments 720).

In some embodiments, shelving-mounted wireless-power-transmitting device further comprises a second mounting structure that is mountable to a second shelving unit, the second shelving unit having a larger width and height than the predetermined height and width of the shelving unit, and the second mounting structure having a ground plane, a third plurality of conductive segments with each adjacent conductive segment of the third plurality is separated by a conductive segment of a fourth plurality of conductive segments. The third and fourth pluralities of conductive segments are disposed over the ground plane to form a second antenna that is configured to radiate second RF wireless power waves towards the second shelving unit such that the larger width and height of the second shelving unit is with a second coverage area of the second RF wireless power waves. A third number of conductive segments in the third plurality of conductive segments is larger than the first number of conductive segments and a fourth number of conductive segments in the fourth plurality of conductive segments is larger than the second number of conductive segments, and the second coverage area is larger than the coverage area.

In some embodiments, to create a larger coverage area more conductive segments are added. Thereby making mounting structures that have enough conductive segments to cover the entire structure of each particular shelving unit. While the example here is of two different shelving units with different mounting structures having wireless-power transmitters with different conductive segment numbers appropriate for the dimensions of those shelving units, third, fourth, fifth sixth, etc. different numbers of such mounting structures to accommodate for different shelving structures are also contemplated.

In another aspect, a backplane (e.g., a substrate with no computing components, as shown as backplane 806 in FIG. 8) includes a radio frequency (RF) wireless-power antenna (e.g., a patch antenna, optionally with a single feed) that is configured to radiate wireless power waves using a first frequency band, the RF wireless-power antenna having a perimeter that is within a perimeter of the backplane (e.g., FIG. 8 illustrates that the RF wireless-power antenna 802 having a perimeter within a perimeter of the backplane 806). The backplane includes a first data-communications antenna (e.g., a Bluetooth Low Energy (BLE) radio) configured to transmit data signals using a second frequency band distinct from the first frequency band, and the first data-communications antenna being coupled to the backplane such that it is outside of a first edge of the perimeter of the RF wireless-power antenna (e.g., FIG. 8 illustrates first data communication antenna 810A coupled to the backplane 806). The backplane includes a second data-communications antenna (e.g., a Bluetooth Low Energy (BLE) radio)

configured to transmit data signals using the second frequency band, and the second data-communications antenna being coupled to the backplane such that it is outside of a second edge of the perimeter of the RF wireless-power antenna. The second edge of the perimeter of the RF wireless-power antenna is perpendicular to the first edge of the perimeter of the RF wireless-power antenna (e.g., FIG. 8 illustrates second data communication antenna 810B coupled to the backplane 806 perpendicular to the first data communication antenna 810A).

In some embodiments, the wireless-power-transmitting device includes a spacer that is coupled between the RF wireless-power antenna and the backplane such that the RF wireless-power antenna is coupled to the spacer and sits above the backplane (e.g., beneath the RF wireless-power antenna and above the backplane). For example, FIG. 8 illustrates a spacer element 808).

In some embodiments, the RF wireless-power antenna is circularly polarized such that the wireless power waves using the first frequency band are transmitted having a circular polarization (e.g., each point in a produced electromagnetic field of the wave has a constant magnitude and rotates at a constant rate in a plane perpendicular to the direction of the wave).

In some embodiments, the first data communication antenna has a first polarization (e.g., horizontal polarization) and the second communication antenna has a second polarization that is different from the first polarization (e.g., a vertical polarization). In some embodiments, the first data communication antenna with the first polarization transmits data data-communication signals to receiving devices having data communication antennas with the first polarization and the second data communication antenna with the second polarization transmits data data-communication signals to receiving devices having data communication antennas with the second polarization (e.g., in this way, receiving devices can be positioned in many different orientations yet still receive reliable data data-communication signals. For instance, wireless power receiving device is oriented such that it receives horizontally polarized data signals and wireless power receiving device is oriented such that it receives vertically polarized data signals In some embodiments, the first and second edges of the RF wireless-power antenna are separated by a third notched edge that separates the first and second edges and is shorter in length than the first and second edges, such that the RF wireless-power antenna has a generally quadrilateral shape (e.g., a shape where at least four of the sides are major sides (e.g., a first length), and additional other sides that are minor sides (e.g., having a second length less than the first length)) with at least one notched edge (e.g., a triangular cut out that alters the exterior shape of the quadrilateral shape) removed from a corner of the quadrilateral (e.g., a square or rectangle antenna would have the upper-left corner notched (e.g., a triangular notch) and the bottom-right corner notched). For example, FIG. 8 illustrates two notched edges (e.g., a first notch 804A and a second notch 804B).

In some embodiments, the RF wireless-power antenna has two notched edges, the two notched edges being symmetrically shaped (e.g., FIG. 8 illustrates that the first notch 804A and the second notch 804B are symmetrical to each other).

In some embodiments, the first communication antenna is placed in a middle of the first edge of the perimeter of the RF wireless-power antenna, and the second communication antenna is placed in a middle of the second edge of the perimeter of the RF wireless-power antenna. FIG. 8 illustrates that first data communication antenna 810A is placed in the middle of the first edge 812A of the perimeter of the RF wireless-power antenna, and the second data communication antenna 810A is placed in the middle of the second edge 812A of the perimeter of the RF wireless-power antenna.

In some embodiments, wherein the RF wireless-power antenna is a patch antenna. In some embodiments, the RF wireless-power antenna is a stamped metal patch antenna.

In some embodiments, the patch antenna is constructed of copper material. In some embodiments, the patch antenna is an alloy that includes copper, steel, aluminum.

In some embodiments, a peak gain of the RF wireless-power antenna is greater than 8 dBi while the first frequency band is a center frequency band of 918 MHz.

In some embodiments, the wireless-power antenna matching is less than −10 dB.

In some embodiments, the first data-communications antenna and the second data-communications antenna produce a peak gain of 5 dBi while operating at the second frequency band of approximately 2.45 GHz. In some embodiments, the first data-communications antenna and second data-communications antenna independently produce a peak gain of 5 dBi at 2.45 GHz.

In some embodiments, the first data-communications antenna and the second data-communications antenna have a matching of greater than −7 dB.

In some embodiments, the RF frequency wireless power antenna improves the gain of both the first data-communications antenna and the second data-communications antenna as a result of their proximity to the wireless-power antenna (e.g., a gain of 1 dB before being near wireless-power antenna and gain of 4 dB after being near wireless-power antenna).

In some embodiments, the first data-communications antenna and the second data-communications antenna use the RF frequency wireless power antenna and a main ground to provide maximum gain and optimum radiation performance of the first data-communications antenna and the second data-communications antenna.

In some embodiments, the first data-communications antenna and the second data-communications antenna are formed using respective stamped copper plates.

In some embodiments, the first data-communications antenna and the second data-communications antenna are each suspended 0.1 to 0.5 inches from a top surface of the backplane (e.g., FIG. 8 illustrates that the first data communication antenna 810A is suspended by post 814A and the second data communication antenna 810B is suspended by post 814B). In some embodiments, the first data-communications antenna and the second data-communications antenna are suspended by a metallic pin/post coupled to the backplane.

In another aspect, a wireless-power transmitting and receiving system, includes a plurality of wireless power-transmitting devices including any of the shelving-mounted wireless power transmitting devices discussed above, and including a plurality of wireless-power harvesters structured in accordance with any of discussion above.

In another aspect, a method of manufacturing a wireless-power device comprises providing a backplane is performed (e.g., a substrate with no computing components) (e.g., a substrate with no computing components, as shown as backplane 806 in FIG. 8). The method of manufacturing the wireless-power device comprises disposing, on the backplane, a radio frequency (RF) wireless-power antenna that is configured to radiate wireless power waves using a first frequency band, the RF wireless-power antenna having a perimeter that is within a perimeter of the backplane (e.g., FIG. 8 illustrates that the RF wireless-power antenna 802 having a perimeter within a perimeter of the backplane 806). The method of manufacturing the wireless-power device comprises coupling a first data-communications antenna (e.g., a Bluetooth Low Energy (BLE) radio) to the backplane such that it is outside of a first edge of the perimeter of the RF wireless-power antenna, wherein the first data-communications antenna transmits data signals using a second frequency band distinct from the first frequency band (e.g., FIG. 8 illustrates first data communication antenna 810A coupled to the backplane 806). The method of manufacturing the wireless-power device comprises coupling a second data-communications antenna (e.g., a Bluetooth Low Energy (BLE) radio) to the backplane such that it is outside of a second edge of the perimeter of the RF wireless-power antenna, The second edge of the perimeter of the RF wireless-power antenna is perpendicular to the first edge of the perimeter of the RF wireless-power antenna, and further wherein the second data-communications antenna transmit data signals using the second frequency band (e.g., FIG. 8 illustrates second data communication antenna 810B coupled to the backplane 806 perpendicular to the first data communication antenna 810A).

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of the present invention can be implemented in, using, or with the assistance of a computer program product, such as a storage medium (media) or computer readable storage medium (media) having instructions stored thereon/ in which can be used to program a processing system to perform any of the features presented herein. The storage medium (e.g., memory 1006 and 1034 in FIG. 10) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

Stored on any one of the machine readable medium (media), features of the present invention can be incorporated in software and/or firmware for controlling the hardware of a processing system (such as the components associated with the wireless-power transmitter 1035 and/or wireless-power receivers 1055), and for enabling a processing system to interact with other mechanisms utilizing the results of the present invention. Such software or firmware may include, but is not limited to, application code, device drivers, operating systems, and execution environments/ containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A wireless-power transmitting system, comprising:
a wireless-power transmitter coupled within an enclosed environment, wherein: the enclosed environment includes one or more shelving units, and
the wireless-power transmitter is configured to radiate radio-frequency (RF) wireless-power waves towards the one or more shelving units using a first frequency band, the wireless-power transmitter includes:
a backplane with one or more data-communications antennas configured to transmit data signals using a second frequency band distinct from the first frequency band,
a ground plane,
a first plurality of conductive segments having a first shape and a first size,
a second plurality of conductive segments having a second shape and a second size, the second shape being distinct from the first shape and the second size being distinct from the first size, wherein a respective conductive segment of the second plurality of conductive segments separates adjacent conductive segments of the first plurality of conductive segments from one another, and
the first and second pluralities of conductive segments being disposed over the ground plane to form an antenna that is configured to radiate RF wireless-power waves; and a wireless-power receiver integrated in a small form-factor device coupled to or on a portion of the shelving unit, wherein:
the wireless-power receiver comprises an antenna and power-conversion circuitry that is configured to convert the RF wireless-power waves harvested by the antenna into usable energy for charging a battery of the small form-factor device or for powering the small form-factor device.

2. The wireless-power transmitting system of claim 1, wherein the wireless-power transmitter is coupled to a supporting structure of the enclosed environment and configured to radiate RF wireless-power waves towards a plurality of the one or more shelving units in the enclosed environment.

3. The wireless-power transmitting system of claim 1, wherein the small form-factor device is configured to at least one of transmit, receive, or display data.

4. The wireless-power transmitting system of claim 1, wherein the enclosed environment includes at least one of:
a room, a building, a warehouse, a cargo compartment, or a delivery compartment.

5. The wireless-power transmitting system of claim 1, wherein the antenna of the wireless-power receiver is a stamped metal harvesting antenna coupled to a PCB that includes components for operating and powering the small form-factor device.

6. The wireless-power transmitting system of claim 5, wherein the stamped metal harvesting antenna is quasi omnidirectional and configured to receive RF wireless power waves having any polarization.

7. The wireless-power transmitting system of claim 1, wherein one or more shelving units include one or more shelves and a respective wireless-power receiver is coupled to each one of the one or more shelves.

8. The wireless-power transmitting system of claim 1, wherein the wireless-power transmitter comprises a radio frequency (RF) wireless-power antenna that is circularly polarized such that the radiated RF power waves are transmitted having a circular polarization.

9. The wireless-power transmitting system of claim 1, wherein the first shape and the second shape are a meandering path that produces a rectangular shape.

10. A method, comprising:
radiating, via a wireless-power transmitter coupled within an enclosed environment, RF wireless-power waves towards one or more shelving units within the enclosed environment, the wireless-power transmitter including:
a ground plane,
a first plurality of conductive segments having a first shape and a first size,
a second plurality of conductive segments having a second shape and a second size, the second shape being distinct from the first shape and the second size being distinct from the first size, wherein a respective conductive segment of the second plurality of conductive segments separates adjacent conductive segments of the first plurality of conductive segments from one another, and
the first and second pluralities of conductive segments being disposed over the ground plane to form an antenna that is configured to radiate RF wireless-power waves;
wherein:
the RF wireless-power waves are configured to be received by a wireless-power receiver coupled to or on a portion of a shelving unit of one or more shelving units, and
the wireless-power receiver that is configured to convert the RF wireless-power waves, harvested by an antenna of the wireless-power receiver, into usable energy for charging a battery of a small form-factor device or for powering the small form-factor device.

11. The method of claim 10, wherein the wireless-power transmitter is coupled to a supporting structure of the enclosed environment and configured to radiate RF wireless-power waves towards a plurality of the one or more shelving units in the enclosed environment.

12. The method of claim 10, wherein the small form-factor device is configured to at least one of transmit, receive, or display data.

13. The method of claim 10, wherein the enclosed environment includes at least one of:
a room, a building, a warehouse, a cargo compartment, or a delivery compartment.

14. The method of claim 10, wherein:
the RF wireless-power waves are configured to be radiated using a first frequency band; and
the wireless-power transmitter comprises a backplane including one or more data-communications antennas configured to transmit data signals using a second frequency band distinct from the first frequency band.

* * * * *

UNITED STATES PATENT AND TRADEMARK OFFICE
CERTIFICATE OF CORRECTION

| | |
|---|---|
| PATENT NO. | : 12,413,097 B2 |
| APPLICATION NO. | : 18/408470 |
| DATED | : September 9, 2025 |
| INVENTOR(S) | : Alister Hoss et al. |

It is certified that error appears in the above-identified patent and that said Letters Patent is hereby corrected as shown below:

On the Title Page

Item [56], Column 2, Line 45, delete "UWB-Antanna," and insert --UWB-Antenna,-- therefor.

In the Specification

Column 21, Line 49, delete "GHZ," and insert --GHz,-- therefor.
Column 35, Line 63, delete "MHZ" and insert --MHz-- therefor.
Column 38, Line 3, delete "810A" and insert --810B-- therefor.
Column 38, Line 4, delete "812A" and insert --812B-- therefor.

Signed and Sealed this
Sixth Day of January, 2026

John A. Squires
*Director of the United States Patent and Trademark Office*